United States Patent [19]
Minami et al.

[11] Patent Number: 5,652,816
[45] Date of Patent: Jul. 29, 1997

[54] OPTICAL COUPLER AND METHOD FOR PRODUCING THE SAME

[75] Inventors: Kohji Minami, Gose; Kuniaki Okada; Hiroyuki Yamamoto, both of Tenri; Yoshio Yoshida, Nara; Yukio Kurata, Tenri, all of Japan

[73] Assignee: Sharp Kabushiki Kaisha, Osaka, Japan

[21] Appl. No.: 659,327

[22] Filed: Jun. 6, 1996

[30] Foreign Application Priority Data

Jun. 9, 1995 [JP] Japan ................................ 7-143736

[51] Int. Cl.$^6$ ................................................ G02B 6/32
[52] U.S. Cl. ................................................ 385/31
[58] Field of Search ........................ 385/31, 39, 49, 385/51, 88, 44, 14, 2, 129, 50, 32; 359/124, 885, 500, 109; 257/686, 689, 728, 735

[56] References Cited

U.S. PATENT DOCUMENTS

| | | | |
|---|---|---|---|
| 4,695,123 | 9/1987 | Chang et al. | 385/11 |
| 5,259,049 | 11/1993 | Bona et al. | 385/49 |
| 5,371,817 | 12/1994 | Revelli, Jr. et al. | 385/44 |
| 5,418,871 | 5/1995 | Revelli, Jr. et al. | 385/44 |
| 5,563,838 | 10/1996 | Wojnarowski et al. | 385/14 |
| 5,574,811 | 11/1996 | Brincheno et al. | 385/52 |

FOREIGN PATENT DOCUMENTS

| | | |
|---|---|---|
| 3-87705 | 4/1991 | Japan . |
| 4-289531 | 10/1992 | Japan . |
| 5-45532 | 2/1993 | Japan . |

*Primary Examiner*—Akm E. Ullah
*Attorney, Agent, or Firm*—David G. Conlin; George W. Neuner

[57] ABSTRACT

An optical coupler of the present invention includes: an optical waveguide including a substrate, a first dielectric layer formed on the substrate, a second dielectric layer which is formed on the first dielectric layer and has a refractive index lower than a refractive index of the first dielectric layer, and a third dielectric layer which is formed on a part of the second dielectric layer and has a refractive index equal to or lower than the refractive index of the second dielectric layer; and a light introducing portion made of a transparent material having a refractive index higher than the refractive index of each of the dielectric layers, the light introducing portion being formed on the optical waveguide and introducing converged incident light into the optical waveguide, wherein the light introducing portion is provided across a surface of the second dielectric layer and a surface of the third dielectric layer and has, as a light incident surface, a flat portion allowing the incident light introduced into the optical waveguide to pass through without eclipse.

6 Claims, 16 Drawing Sheets

1

OPTICAL COUPLER AND METHOD FOR PRODUCING THE SAME

BACKGROUND OF THE INVENTION

1. Field of the Invention

The present invention relates to an optical coupler and a method for producing the same. In particular, the present invention relates to an optical coupler in which a light introducing portion for introducing incident light into an optical waveguide is formed on a substrate so as to be monolithic with the optical waveguide.

2. Description of the Related Art

In recent years, technologies concerning optical waveguides have come to be rapidly and widely applied to optical fibers, optical integrated pickup devices, etc. The method for utilizing an optical waveguide falls roughly into two categories. One of the categories is a method in the optical communication field. According to this method, optical coupling is conducted by allowing the end face of a light source to be faced with that of an optical waveguide. In this optical coupling method, the mechanism for inputting light into an optical fiber is typically found in the art. The other category is a method for inputting light from outside into an optical waveguide through a light input portion such as a diffraction grating provided on the surface of an optical waveguide. In the case where an optical waveguide is used for optical pickup, light input means (coupler) such as a diffraction grating is provided on the surface of an optical waveguide.

According to the present invention, a coupler is provided on the surface of an optical waveguide, whereby light is input into the optical waveguide. Considering miniaturization of an optical pickup device by adopting the optical waveguide, this is an indispensable technique. A prism coupler and a grating coupler are often used as the coupler. In particular, a grating coupler is generally used so as to make a coupler portion integrated and thin.

FIG. 17 shows an application of a grating coupler in a conventional optical pickup device. As shown in this figure, an optical pickup device 100 includes a grating coupler 109, through which the optical pickup device 100 is optically coupled to a recording medium, i.e., an optical disk 110.

The grating coupler 109 functions so as to guide light diffracted by a diffraction grating provided on the surface of an optical waveguide 102 into the optical waveguide 102. The grating coupler 109 and the optical waveguide 102 constitute an optical waveguide element. In the example illustrated in FIG. 17, since the optical waveguide element is incorporated in the optical pickup device 100 for obtaining a magneto-optic signal, the grating coupler 109 of the optical waveguide element has a curved grating with a function of converging light onto the optical disk 110.

In the optical pickup device 100, laser light emitted by a light source (semiconductor laser) 101 is incident upon the three dimensional optical waveguide 102 formed on a substrate 107. The incident light propagates through the optical waveguide 102 during which the incident light is partially fed back by a grating 103 provided in the optical waveguide 102. This allows stabilized laser light to be output from the optical waveguide 102 to a slab optical waveguide 105 as a laser beam. This laser beam is collimated by a grating lens 108, propagates through a grating splitter 106, and is radiated to the optical disk 110 by the grating coupler 109.

The reflected light from the optical disk 110 is collimated by the grating coupler 109, split by the grating splitter 106,

2 converged by the grating lens 108, and is incident upon detectors 104. The detectors 104 generate electric signals in accordance with the amount of the received light, respectively.

As described above, the grating coupler 109 of the optical pickup device 100 as shown in FIG. 17 converges light from the semiconductor laser 101 onto the optical disk 110, and inputs light reflected from the optical disk 110 into the optical waveguide element 102.

However, grating couplers have numerous problems. For example, the efficiency at which light incident upon a grating coupler is converted into light propagating through an optical waveguide (hereinafter, referred to as a coupling efficiency) depends upon the degree to which the condition of phase matching between light propagating through the optical waveguide and light diffracted by the diffraction grating is satisfied.

In the case where coupling is accomplished by the −1st order diffraction, the condition of phase matching is represented by the following equation:

$$N(\lambda) = \sin\theta_i - \lambda/\Lambda$$

where $\lambda$ is a wavelength of incident light in air; N is an effective refractive index (a value obtained by dividing a phase constant of propagating light by $2\pi/\lambda$); $\theta_i$ is an incident angle (an angle formed by an optical axis of incident light with respect to a normal of the surface of the optical waveguide); and $\Lambda$ is a grating pitch.

$N(\lambda)$ changes by about $10^{-4}$/nm upon the change in the wavelength $\lambda$, while $\lambda/\Lambda$ changes by about $10^{-3}$/nm upon the change in the wavelength $\lambda$ under the condition that a general value of $\Lambda$ is 1 μm. The change in $\lambda/\Lambda$ is greater than that in $N(\lambda)$. Thus, the phase matching condition greatly changes with respect to the changes in wavelength of light incident upon an optical coupler.

In semiconductor lasers used as light sources in optical pickup devices, lasing wavelength is varied depending upon each laser and lasing wavelength changes due to the working environment temperature. Therefore, when light is coupled to the optical waveguide, a stable coupling efficiency cannot be obtained because of the changes in phase matching condition.

In order to solve the above-mentioned problem, in the conventional optical waveguide element shown in FIG. 17, laser light from the light source is partially fed back to the light source so as to suppress the changes in wavelength of output light from the light source, whereby a coupling efficiency is stabilized.

However, there is another problem causing the decrease in coupling efficiency in addition to the changes in wavelength. Diffraction is used for introducing light into the optical waveguide. This causes a loss of energy of light which is not diffracted at an angle appropriate for being coupled to the optical waveguide.

Furthermore, when a grating coupler and a portion for stabilizing the wavelength of light incident upon the grating coupler are provided on the identical substrate, the method for using the optical waveguide element is restricted.

Considering the above-mentioned problems, it is desired that a grating coupler be capable of reducing the changes in coupling efficiency due to the changes in wavelength and obtaining a high coupling efficiency. In this respect, prism couplers are outstanding for use in the optical waveguide element.

More specifically, according to the coupling principle of prism couplers, when light is incident upon the vicinity of an edge of a prism (the boundary between a portion where the prism is present and a portion where the prism is not present; i.e., the boundary between the prism and air), light, which is once introduced into an optical waveguide at a portion where the prism is present, can be prevented from going out of a portion where the prism is not present. For the above coupling principle of prism couplers to hold true, in the case where the base angle of the prism is substantially equal to an angle at which light is incident on the surface of the optical waveguide, a phase matching condition, which is represented by $N(\lambda)=n_p(\lambda) \sin \theta_i$, where $n_p$ is a refractive index of the prism, is satisfied. The degrees of changes in $N(\lambda)$ and $n_p(\lambda)$ in air with respect to the wavelength $\lambda$ of incident light are relatively close to each other. Therefore, the changes in the phase matching condition with respect to the changes in wavelength are smaller than those of grating couplers, and the tolerance of a coupling efficiency with respect to the changes in wavelength is greater than that of grating couplers.

FIG. 18 shows a conventional exemplary prism coupler disclosed in Japanese Laid-Open Patent Publication No. 3-87705. In this figure, a prism 115 is fixed onto an optical waveguide 111 with a dielectric adhesive 114 in a prism coupler 200. The optical waveguide 111 is provided on a substrate 118, with a first gap adjusting layer 112 and a second gap adjusting layer 113 layered onto the optical waveguide 111 in this order. The prism 115 is provided above an opening portion of the second gap adjusting layer 113. In the prism coupler 200, light 116 is incident upon the vicinity of the boundary between the dielectric adhesive 114 and the gap adjusting layer 113.

The coupling principle of the prism coupler 200 will now be described. The boundary between the dielectric adhesive 114 and the gap adjusting layer 113 in the prism coupler 200 corresponds to that between the above-mentioned prism and air. Light incident upon the vicinity of the boundary through the dielectric adhesive 114 is input into the surface of the gap adjusting layer 112 at an angle larger than a total reflection angle. However, the light passes through the gap adjusting layer 112 by a tunnel effect-like function to be incident upon the optical waveguide layer 111. The light incident entering the optical waveguide layer 111 is totally reflected from the boundary between the optical waveguide layer 111 and the substrate 118, travels to the gap adjusting layer 112, and is incident upon a thick portion of the first and second gap adjusting layers 112 and 113. At this time, the light is totally reflected toward the substrate 118 without being affected by a tunnel effect-like function. Due to the repetition of total reflection of light in the optical waveguide layer 111, light propagates through the optical waveguide layer 111.

According to this principle, optical coupling between the optical waveguide and other optical systems is realized by a tunnel effect-like function of light propagating through the thin dielectric layer on the surface of the optical waveguide. Therefore, light loss can be minimized and as a result, a coupling efficiency can be increased to about 80%.

As described above, prism couplers are effective. However, there is a limit to the size of a prism to be attached to the optical waveguide: the minimum size is a bottom area of about 1 mm$^2$ and a height of about 1 mm. Thus, the size of an optical waveguide element which includes a prism and an optical waveguide is almost determined by the size of the prism. In other words, even in the case where incident light having a small beam diameter of, for example, 100 µm or less is coupled, a substantially large prism is required.

Since prism couplers are thicker in their height direction, the integration of the prism couplers becomes lower compared with grating couplers. This means that the main characteristics of the optical waveguide element, such as thinness and smallness, cannot be exhibited.

Furthermore, it is more difficult to fix a smaller prism onto an optical waveguide. This results a unit value of one prism becoming more expensive.

In addition, prisms are required to be fixed one by one in the course of production of a coupler, causing the problem related to mass-production.

SUMMARY OF THE INVENTION

In accordance with one embodiment of the present invention, an optical coupler comprises an optical waveguide including a substrate, a first dielectric layer formed on the substrate, a second dielectric layer which is formed on the first dielectric layer and has a refractive index lower than a refractive index of the first dielectric layer, and a third dielectric layer which is formed on a part of the second dielectric layer and has a refractive index equal to or lower than the refractive index of the second dielectric layer; and a light introducing portion made of a transparent material having a refractive index higher than the refractive index of each of the dielectric layers, the light introducing portion being formed on the optical waveguide and introducing converged incident light into the optical waveguide. The light introducing portion is provided across a surface of the second dielectric layer and a surface of the third dielectric layer and has, as a light incident surface, a flat portion has the size allowing the incident light introduced into the optical waveguide to pass through without eclipse.

In this optical coupler, a light introducing portion is provided across the boundary between a thin portion and a thick portion of a dielectric layer included in an optical waveguide. The light introducing portion has a flat section, through which incident light introduced into the optical waveguide can pass without eclipse. Therefore, light can be coupled to the optical waveguide, based on the principle of a prism coupler having a coupling efficiency with great tolerance with respect to the changes in wavelength.

Furthermore, the light introducing portion is formed on the optical waveguide by molding a transparent material having a refractive index higher than that of the dielectric layer. Therefore, it is not required that the light introducing portion be separately produced as in a prism, and then placed on the optical waveguide. This results in the optical couple being more simply mass-produced.

In accordance with one aspect of the present invention, the light introducing portion of the optical coupler is composed of a part of a resin layer having a refractive index higher than the refractive index of each of the dielectric layers and is formed over an entire surface of the second dielectric layer and the third dielectric layer of the optical waveguide.

In this optical coupler, resin is used as a transparent material for the light introducing portion, so that the cost for producing the optical coupler can be decreased.

In accordance with a further aspect of the present invention, the optical coupler is characterized by an angle $\alpha$ between the light incident surface of the light introducing portion and a light incident surface of the optical waveguide that is equal to an incident angle $\theta_i$ of light with respect to the light incident surface of the optical waveguide, a boundary between a portion of the surface of the second dielectric layer in contact with the light introducing portion and a portion of the surface of the second dielectric layer in contact with the third dielectric layer is in parallel with a lower end of the light incident surface of the light introducing portion, and a distance B between a lower end of a light incident surface of the optical waveguide and the boundary, a height H of an upper end of the light incident surface of the light introducing portion from the surface of the second dielectric layer, a beam diameter $w_0$ of the incident light at a beam waist, and a thickness $l$ of a portion of the resin layer other than the light introducing portion satisfy the following relationships:

$$B > x_1/\sin\theta_f - l/\tan\theta_f + L/2$$

$$H > 2y_1 \sin\theta_f + l$$

$$L = \rho w_0/[\cos\theta_f \{1-(4\rho^2\lambda^2 \tan^2\theta_f/n_p^2\pi^2 w_0^2)\}^{1/2}]$$

$$x_1 = \{-b_2 + (b_1^2 - a_1 c_1)^{1/2}\}/a_1$$

$$y_1 = x_1/\tan\theta_f - l/\sin\theta_f$$

$$a_1 = 1/\tan^2\theta_f - 4\lambda^2\rho^2/n_p^2\pi^2 w_0^2$$

$$b_1 = -l/\sin\theta_f \cos\theta_f$$

$$c_1 = l^2/\sin^2\theta_f - w_0^2\rho^2/4$$

$$\rho = \{-ln(0.18)\}^{1/2}$$

where $n_p$ is a refractive index of the resin layer, $\lambda$ is a wavelength of the incident light, and $\rho$ is a coefficient stipulating a beam diameter $\rho w_0$ containing at least 99% of the energy of the incident light.

In this optical coupler, the size and shape of the light introducing portion are stipulated based on the wavelength of incident light, the beam diameter at a beam waist, the refractive index of a material for the light introducing portion, and the incident angle of the incident light with respect to the incident surface of the optical waveguide. Therefore, the light introducing portion can be designed as small as possible.

In another embodiment according to the present invention, an optical coupler comprises a substrate on which a groove having a reflective surface reflecting incident light is formed; a dielectric region formed on the substrate so as to fill the groove; a first dielectric layer formed on a surface of the dielectric region so that an end portion thereof is positioned in the groove; a second dielectric layer formed on the dielectric region and the first dielectric layer; and a third dielectric layer formed on the second dielectric layer. The first dielectric layer, the second dielectric layer, and the third dielectric layer form an optical waveguide. The reflective surface of the groove and the dielectric region in the groove form a light introducing portion for introducing the incident light into the optical waveguide. A refractive index $n_1$ of the first dielectric layer, a refractive index $n_q$ of the dielectric region, a refractive index $n_2$ of the second dielectric layer, and a refractive index $n_3$ of the third dielectric layer satisfy relationships $n_1 \leq n_2$, $n_2 < n_3$, and the refractive index $n_q$ is higher than any of the refractive indices $n_1$, $n_2$, and $n_3$.

This optical coupler has a substrate on which a groove having a reflective surface for reflecting incident light is formed. An optical waveguide is provided on the substrate via a dielectric layer in such a manner that the boundary between a thin portion and a thick portion of the dielectric layer forming the optical waveguide is positioned in the groove of the substrate. Furthermore, the dielectric region in the groove is made into a light introducing portion for introducing incident light into the optical waveguide. Therefore, optical coupling with the optical waveguide can be conducted based on the principle of a prism coupler having a coupling efficiency with great tolerance with respect to the changes in wavelength.

Moreover, since the light introducing portion is provided between the substrate and the optical waveguide, it is not required that the light introducing portion be separately produced, as in a prism, and then placed on the optical waveguide. This results in the optical couple being more simply mass-produced. Furthermore, there are no projections from the surface of the optical waveguide. Thus, the optical coupler can be made thinner and smaller, compared with the one in which a light introducing portion made of a material with a high refractive index is formed on the optical waveguide.

In accordance with another embodiment according to the present invention, an optical coupler comprises a substrate on which a groove having a reflective surface reflecting incident light is formed; a dielectric region formed on the substrate so as to fill the groove; a first dielectric layer formed on a surface of the dielectric region so that an end portion thereof is positioned in the groove; a second dielectric layer formed on the dielectric region and the first dielectric layer; a third dielectric layer formed on the second dielectric layer; and a fourth dielectric layer formed on the third dielectric layer. The first dielectric layer, the second dielectric layer, and the third dielectric layer form an optical waveguide. The reflective surface of the groove and the dielectric region in the groove form a light introducing portion for introducing the incident light into the optical waveguide. A refractive index $n_1$ of the first dielectric layer, a refractive index $n_q$ of the dielectric region, a refractive index $n_2$ of the second dielectric layer, and a refractive index $n_3$ of the third dielectric layer, and a refractive index $n_4$ of the fourth dielectric layer satisfy relationships $n_1 \leq n_2$, $n_2 < n_3$, and $n_4 < n_3$ and the refractive index $n_q$ is higher than any of the refractive indices $n_1$, $n_2$, $n_3$, and $n_4$.

As described above, in addition to the first, second, and third dielectric layers forming the optical waveguide, the fourth dielectric layer is formed on the third dielectric layer in this optical coupler. Therefore, the difference in effective refractive index with respect to the incidence of TE light and TM light upon the optical coupler becomes smaller than the case where the fourth dielectric layer is not provided, and the coupling efficiency of the TE light and the TM light in the case where the TE light and the TM light are simultaneously incident can be increased.

Furthermore, the fourth dielectric layer allows the intensity distribution of light propagating through the optical waveguide to be biased to the upper side of the optical waveguide, compared with the case where the fourth dielectric layer is not provided. Therefore, the thickness of the first dielectric layer required for preventing the loss of light caused by the re-coupling of light with the dielectric region can be made thinner, compared with the case where the fourth dielectric layer is not provided. That is, the depth of the groove to be formed in the dielectric region in the course of production of the optical coupler can be made smaller.

In accordance with one aspect of the present invention, a method for producing an optical coupler as mentioned above comprises the steps of supplying a UV-curable resin on the optical waveguide including the first dielectric layer, the second dielectric layer, and the third dielectric layer; and irradiating UV-light to the resin supplied on the optical waveguide while holding the resin in a predetermined shape using a frame member transmitting UV-light, the frame member having a concave portion with a flat region corresponding to the light incident surface of the light introducing portion.

According to this method, in the course of production of the above-mentioned optical coupler, UV-curable resin is supplied on the optical waveguide including the first, second, and third dielectric layers, and the resin is held in a predetermined shape by using a UV-transparent frame member with a concave portion having a flat portion corresponding to the incident surface of the light introducing portion. Under this condition, the resin is cured by the irradiation of UV-light. Therefore, problems involved in producing prisms, such as those caused when prisms are fixed onto prism couplers and those related to mass-production, can be solved, and the cost of producing optical couplers can be decreased.

Thus, the invention described herein makes possible the advantages of (1) providing an optical coupler capable of conducting optical coupling to an optical waveguide element, based on the principle of a prism coupler in which a coupling efficiency has greater tolerance with respect to the changes in wavelength; (2) providing a thinner optical coupler which has more outstanding integration compared with a conventional prism coupler and is easily mass-produced; and (3) providing a method for producing the optical coupler.

These and other advantages of the present invention will become apparent to those skilled in the art upon reading and understanding the following detailed description with reference to the accompanying figures.

BRIEF DESCRIPTION OF THE DRAWINGS

FIG. 1A is a plan view of an optical coupler and described in Example 1; and FIG. 1B is a cross-sectional view thereof taken along a line Ib—Ib of FIG. 1A.

FIG. 2A shows a method for setting the size of a prism required for a prism coupler; and FIG. 2B shows an x-y coordinate system for calculating the size of the prism.

FIGS. 6A and 6B are cross-sectional views of the optical coupler during the steps of forming an optical waveguide; and FIG. 6C is a plan view of the optical waveguide shown in FIG. 6B.

FIG. 7A shows a state in which resin is supplied onto a stamper; FIG. 7B shows a state in which the optical waveguide is pressed against the stamper; and FIG. 7C shows a state in which a light introducing portion formed by molding resin is removed from the stamper.

FIG. 8A is a plan view of a molding surface of the stamper; FIG. 8B is a view showing the structure taken along a line XIIIb—XIIIb of FIG. 8A; and FIG. 8C is a perspective view of a stamper having a plurality of resin molding portions.

FIG. 10A is a cross-sectional view of the optical coupler; and FIG. 10B shows a state in which incident light is introduced into an optical waveguide through the optical coupler.

FIGS. 11A, 11C, and 11D are cross-sectional views of the optical coupler during the production step; and FIG. 11B is a plan view of the optical coupler in the course of production.

FIGS. 12A, 12C, 12D, and 12F are cross-sectional views of the optical coupler in the course of production; and FIGS. 12B and 12E are plan views of the optical coupler in the course of production.

DESCRIPTION OF THE PREFERRED EMBODIMENTS

Hereinafter, the present invention will be described.

Figure 2A:
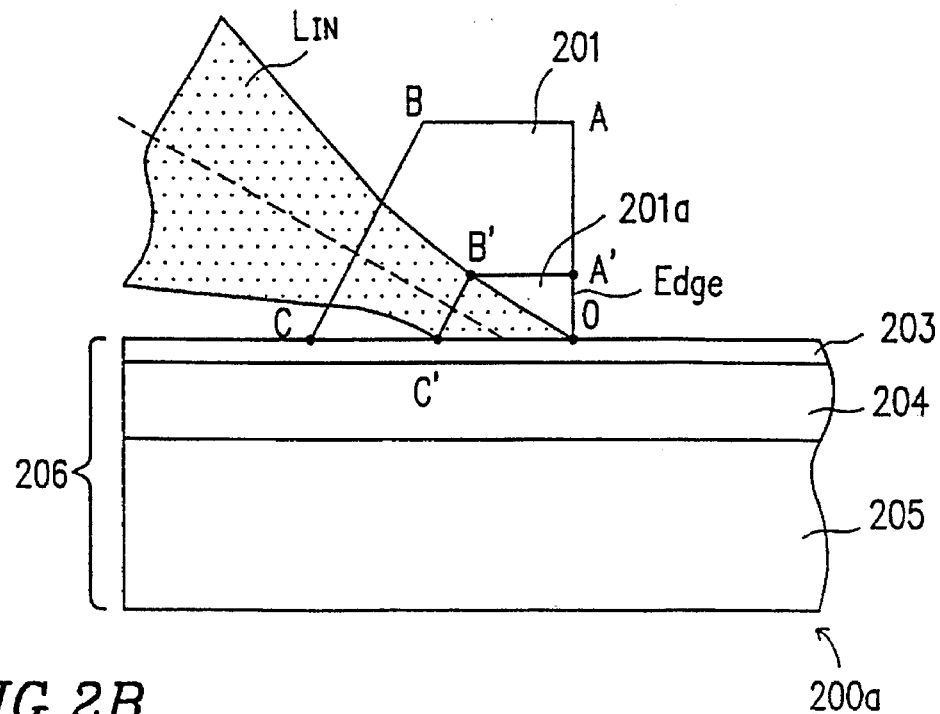
FIGS. 2A and 2B illustrate a basic principle of the present invention.

FIG. 2A shows an example of a prism coupler arranged with dielectric layers formed on a substrate. In a coupler 200a, incident light $L_{IN}$ with a small beam diameter is coupled to an optical waveguide 206 by a sufficiently large prism 201 (represented by ABCO in the figure). The optical waveguide 206 includes first and second dielectric layers 204 and 203 formed on the substrate 205.

Figure 2B:
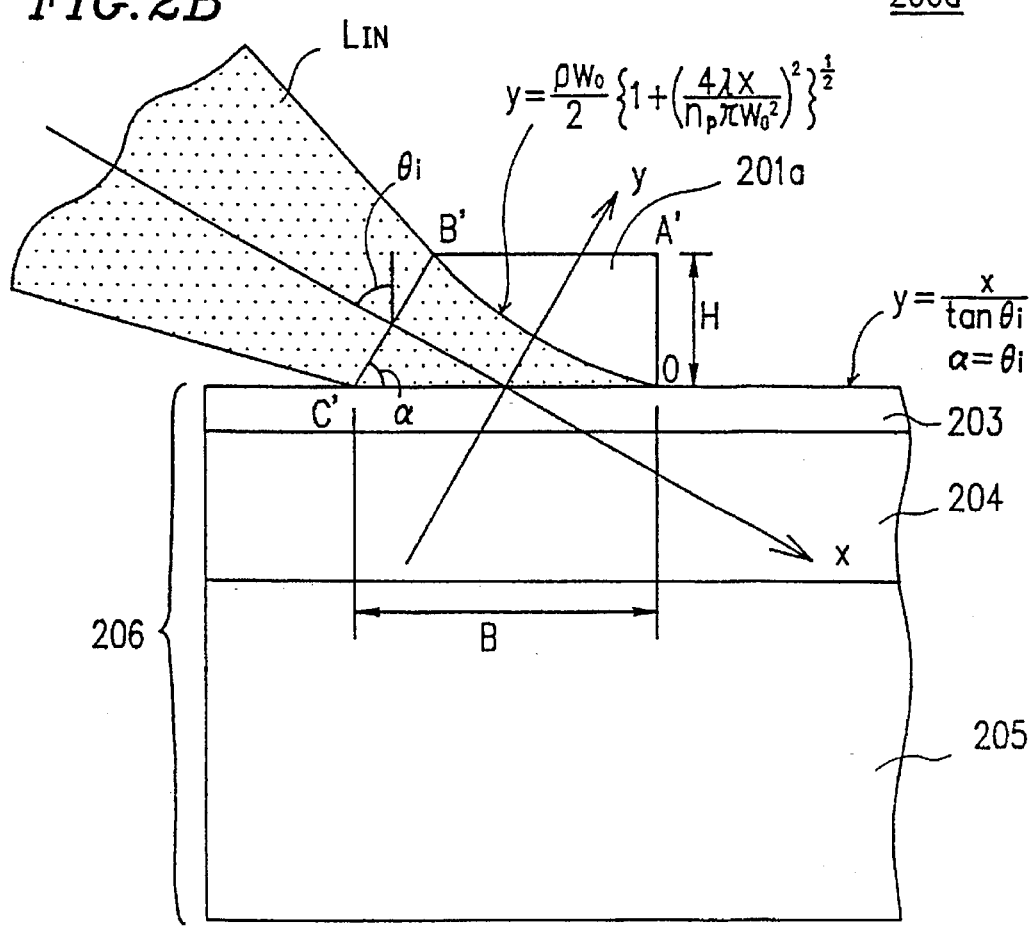

FIG. 2B shows a portion 201a of the prism 201 which has a minimum size necessary for introducing the incident light $L_{IN}$ into the prism 201. Hereinafter, this portion 201a is simply referred to as a minimum portion. In the case where light is incident upon the surface of the optical waveguide 206 at a beam waist (i.e., a position where the incident light $L_{IN}$ is most focused), the size of the minimum portion 201a of the prism 201 (represented by A'B'C'O in the figure) required for allowing the incident light $L_{IN}$ to be coupled to the optical waveguide 206 without eclipse in incidence upon the prism 201.

As shown in FIG. 2B, parameters for defining a profile of an incident light beam and the size of the minimum portion 201a of the prism 201 are determined. An x-y coordinate system having, as an origin, a crossing point of an optical axis of the incident light and the surface of the optical waveguide is determined so that an x-axis is matched with the optical axis. The profile of the incident light beam in the minimum portion 201a of the prism 201, which corresponds to a curve B'O in FIG. 2B, is represented by $y=\rho w_0/2 \cdot \{1+(4\lambda x/n_p \pi w_0^2)^2\}^{1/2}$, where $w_0$ is a beam diameter of the incident light beam at the beam waist (i.e., beam diameter of a portion where the intensity distribution becomes a value obtained by multiplying the maximum value by $1/e^2$ or more); $\lambda$ is the wavelength of the incident light beam; $\theta_i$ is the incident angle with respect to the minimum portion 201a of the prism 201; and $n_p$ is the refractive index of the prism 201. A straight line, which passes through the origin of the x-y coordinate system and is parallel with the surface of the optical waveguide 206, is represented by $y=x/\tan \theta_i$.

From these equations, the condition determining the size of the minimum portion 201a of the prism 201 is represented as follows:

$$B>\rho w_0/\{\cos^2 \theta_i-(4\rho^2\lambda^2 \sin^2 \theta_i/n_p^2\pi^2 w_0^2)\}^{1/2} \quad (1)$$

$$H>\rho w_0 \sin \theta_i/\{1-(4\rho^2\lambda^2 \tan^2 \theta_i/n_p^2\pi^2 w_0^2)\}^{1/2} \quad (2)$$

$$\alpha=\theta_i \quad (3)$$

$$\theta_i=\sin^{-1}\{(N_{TE}+N_{TM})/2n_p\} \quad (4)$$

$$\rho=\{-ln(0.18)\}^{1/2} \quad (5)$$

where $\rho$ is a coefficient stipulating the beam diameter $\rho w_0$ in which 99% or more energy of the incident light is included; and $N_{TE}$ and $N_{TM}$ in Expression (4) are effective refractive indices of TE light and TM light, respectively. In FIGS. 2A and 2B, the TE light and the TM light are light having a vibration direction perpendicular to the drawing surface, and light having a vibration direction perpendicular to the light incident direction, respectively.

Figure 3:
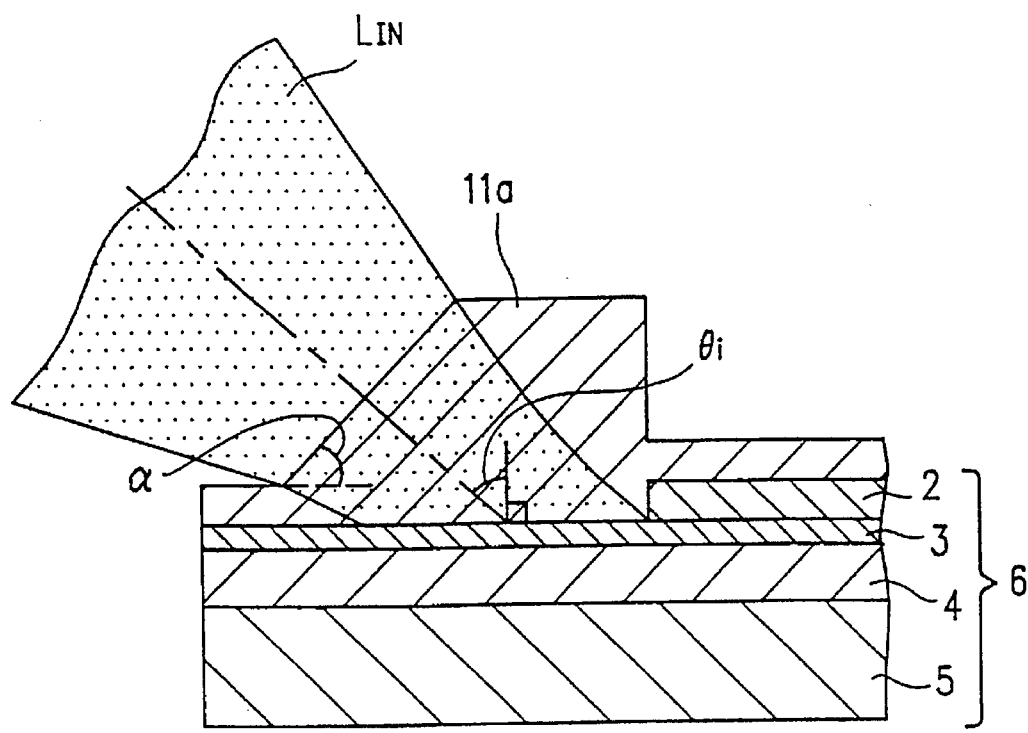
FIG. 3 is a cross-sectional view showing a first modified shape of a light introducing portion of the optical coupler according to the present invention and described in Example 1.

Next, an optical coupler shown in FIG. 3 will be described. This prism coupler has an optical waveguide 6 including a substrate 5, a first dielectric layer 4 formed on the substrate 5, a second dielectric layer 3 with a refractive index lower than that of the first dielectric layer 4, and a third dielectric layer 2 which is formed on a part of the second dielectric layer 3 and has a refractive index lower than or equal to that of the second dielectric layer 3. A light introducing portion 11a is provided on the optical waveguide 6, which is made of a material with a high refractive index such as resin and has one incident surface.

In the above structure, when light is incident upon the vicinity of the boundary between a portion where the third dielectric layer 2 is present and a portion where the third dielectric layer 2 is not present through the light introducing portion 11a, at the portion where the third dielectric layer 2 is not present, the light passes through the second dielectric layer 3 due to a tunnel effect-like function and is incident upon the first dielectric layer 4. The light incident upon the first dielectric layer 4 is reflected from the boundary surface between the substrate 5 and the first dielectric layer 4 and returns to the second dielectric layer 3. At the portion where the third dielectric layer 2 is present, the light does not pass through the third dielectric layer 2 to return to the light introducing portion 11a side. Thus, the light propagates through the optical waveguide 6 and is coupled to the optical waveguide 6 based on the coupling principle of a prism coupler.

The minimum size of the light introducing portion 11a required for introducing light into the optical waveguide 6 without eclipse by the portion 11a is determined so as to satisfy the condition obtained in a similar manner to that of the prism 201 shown in FIGS. 2A and 2B. The condition will be described in later in Examples. Thus, the thickness of the optical coupler can be made thin in accordance with the incident beam diameter $w_0$.

Furthermore, in the above structure, the light introducing portion 11a is merely formed on the optical waveguide 6 with a material having a high refractive index. Therefore, there is no difficulty in attaching a prism to the optical waveguide 6. As the material with a high refractive index, inexpensive resin can be used, resulting in the decrease in cost for producing the optical coupler.

When resin (UV-curable resin, etc.) is used as the material with a high refractive index, a molding technique such as a 2P method can be used in the course of producing the light introducing portion. Therefore, light introducing portions (optical coupling portions) can be simultaneously produced on a plurality of optical waveguides formed on the identical substrate so as to obtain a plurality of optical waveguide elements.

Alternatively, according to the present invention, a deep groove having a reflective surface for reflecting incident light is formed on a substrate, and a layer made of a material with a refractive index higher than that of the substrate is formed on the substrate so that the deep groove is filled with the layer. Then, a shallow groove, for performing a function corresponding to that of the edge of a prism in a prism coupler, is formed so that the end of the shallow groove is positioned in the deep groove. A first dielectric layer is buried in the shallow groove. A second dielectric layer and a third dielectric layer are formed on the layer having a high refractive index with the first dielectric layer buried therein, whereby an optical coupler is formed. Here, the first to third dielectric layers constitute an optical waveguide, and the reflective surface of the deep groove and the layer with a high refractive index buried in the deep groove constitute a light introducing portion for introducing incident light into the optical waveguide. In the optical coupler with this structure, there are no projections from the surface of the optical waveguide. Therefore, this optical coupler can be made thinner and smaller than the coupler in which a light introducing portion made of a material with a high refractive index is formed on the optical waveguide.

In the optical coupler with the above structure, incident light is coupled to the optical waveguide based on the coupling principle of a prism coupler. More specifically, light incident from above the third dielectric layer is reflected from the reflective surface of the deep groove and is then incident upon the second dielectric layer in the vicinity of the boundary between the first dielectric layer and the layer with a high refractive index from the substrate side. The incident light passes through the second dielectric layer by a tunnel effect-like function and is incident upon the third dielectric layer. Then, light reflected from the boundary between the third dielectric layer and air travels to the second dielectric layer while going away from the reflective surface. In a portion farther from the reflective surface than that of the point of incidence, a tunnel effect-like function is not exhibited because the dielectric layer under the third dielectric layer is thick. Thus, light propagates through the third dielectric layer, whereby optical coupling is conducted.

Furthermore, by providing a fourth dielectric layer on the above-mentioned third dielectric layer constituting the optical waveguide, the difference in effective refractive index between the incidence of TE light and that of TM light becomes smaller than the case without the fourth dielectric layer. Thus, a coupling efficiency at the time of the simultaneous incidence of TE light and TM light increases.

Still furthermore, the fourth dielectric layer allows the intensity distribution of light propagating through the optical waveguide to be biased to the upper side of the optical waveguide, compared with the case without the fourth dielectric layer. Therefore, the thickness of the first dielectric layer required for preventing light loss due to optical re-coupling with the dielectric region can be made smaller than the case without the fourth dielectric layer. In other words, the depth of the groove formed on the dielectric region in the course of producing an optical coupler can be made smaller.

Hereinafter, the present invention will be described by way of illustrative examples.

EXAMPLE 1

Figure 1A:
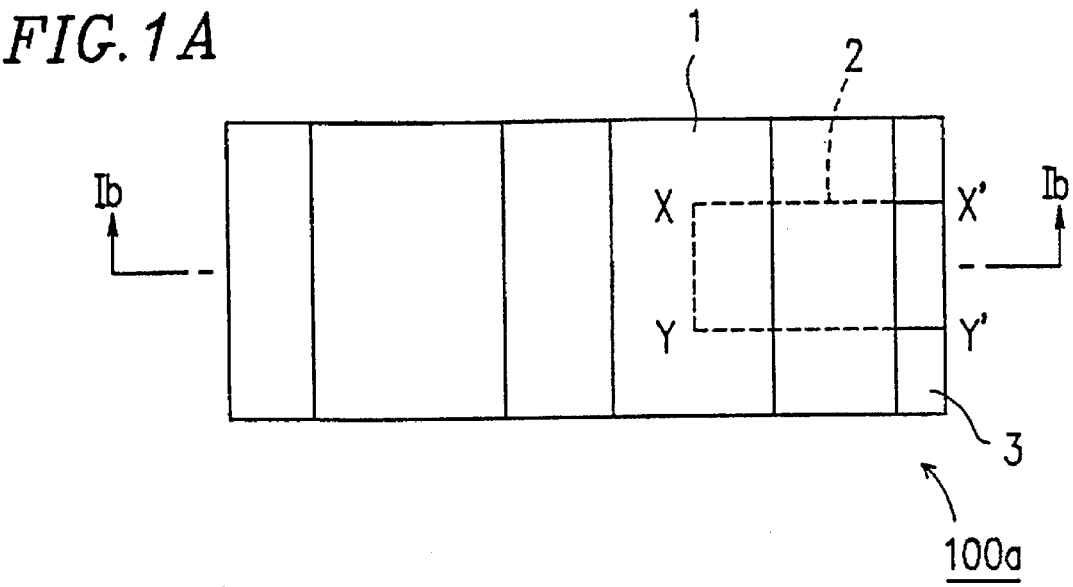
FIGS. 1A and 1B illustrate the structure of an optical coupler according to the present invention.
Figure 1B:
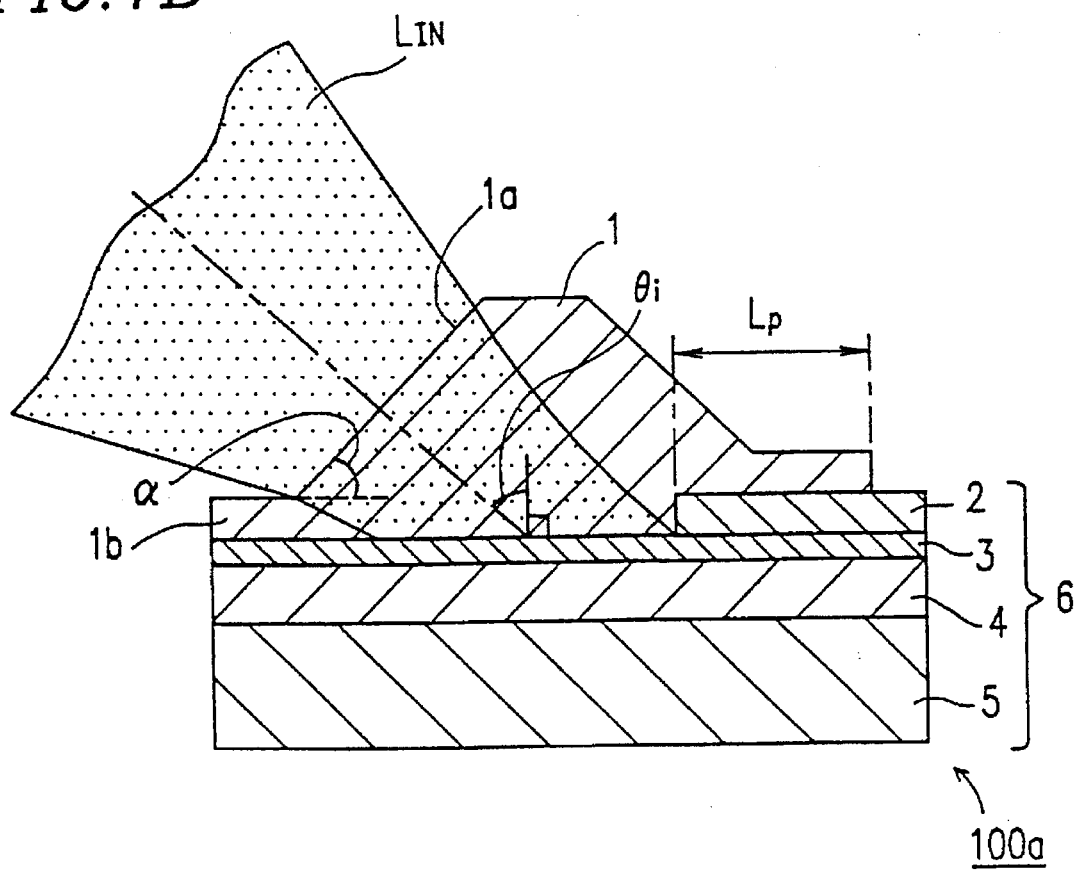

FIGS. 1A and 1B illustrate an optical coupler according to the present invention. FIG. 1A is a plan view of the optical coupler, and FIG. 1B is a cross-sectional view of the optical coupler taken along a line Ib—Ib of FIG. 1A. An optical coupler 100a includes an optical waveguide 6 and a light introducing portion 1, formed on the optical waveguide 6, for introducing incident light $L_{IN}$ into the optical waveguide 6.

The optical waveguide 6 includes a substrate 5, a first dielectric layer 4 formed on the substrate 5, and a second dielectric layer 3 which is formed on the first dielectric layer 4 and has a refractive index lower than that of the first dielectric layer 4, and a third dielectric layer 2 which is formed on a part of the second dielectric layer 3 and has a refractive index lower than or equal to that of the second dielectric layer 3.

The light introducing portion 1 is made of a transparent material having a refractive index higher than that of the dielectric layers 2, 3, and 4. The light introducing portion 1 is positioned so as to extend from the surface of the second dielectric layer 3 to the surface of the third dielectric layer 2, as shown in FIG. 1B. The light introducing portion 1 has a flat portion 1a which functions as an incident surface through which light is incident upon the optical waveguide 6 and which has the size allowing the incident light to be introduced into the optical waveguide 6 without eclipse.

Hereinafter, a specific example of a structure of an optical coupler will be described by illustrating the case where a light beam having a beam diameter $w_0$ of 3.76 μm at a beam waist is incident upon the optical coupler 100a. The beam diameter $w_0$ of a light beam at a beam waist refers to a beam diameter, obtained by converging parallel light having a wavelength λ of 780 nm with a lens which has a numerical aperture (NA) of 0.17 and has a pupil radius equal to a beam diameter of the incident light.

In the present example, a thermally oxidized Si substrate having a SiO$_2$ layer is used as the substrate 5. A #7059 Glass layer (thickness=570 nm; produced by Corning) and a SiO$_2$ layer (thickness=100 nm) are formed on the Si substrate 5 as the first and second dielectric layers 4 and 3, and the third dielectric layer 2, which is also made of SiO$_2$, is formed on the second dielectric layer 3, whereby the optical waveguide 6 is constituted.

The third dielectric layer 2 is a main portion of the optical coupler 100a for optical coupling. The third dielectric layer 2 is formed on a part (i.e., a part surrounded by XYX'Y' in the plan view of FIG. 1A) of the second dielectric layer 3 of the optical waveguide 6. Here, length XY is greater than $\rho w_0$ so as to allow the whole incident light $L_{IN}$ to pass through.

In the optical coupler, 100a of the present example, the light introducing portion 1 is formed on the optical waveguide 6 so as to cover the boundary between a portion where the third dielectric layer 2 is present and a portion where the third dielectric layer 2 is not present. The light introducing portion 1 is molded into a shape as shown in FIG. 1B by using transparent resin as a material having a refractive index higher than that of the third dielectric layer 2.

Assuming that the wavelength λ of light incident upon the optical coupler 100a is 780 nm, the refractive index of the SiO$_2$ layer of the thermally oxidized substrate 5 is 1.44, that of #7059 glass forming the first dielectric layer 4 is 1.53, and that of the SiO$_2$ layer used for the second and third dielectric layers 3 and 2 is 1.43. Therefore, as a material for forming the light introducing portion 1, resin having a refractive index higher than these refractive indices is selected. For example, in the present example, resin with a refractive index $n_q$ of 1.57 is used.

The thickness of the #7059 glass layer 4 and the SiO$_2$ layer 3 is determined so that a coupling efficiency becomes maximum when a light beam (wavelength λ=780 nm) having a beam diameter $w_0$ of 3.76 μm at a beam waist is incident upon the optical coupler.

More specifically, the thickness is determined as follows.

(a) The effective refractive indices in the optical coupler with respect to TE light and TM light are obtained from expressions defining the condition to be satisfied by the boundaries of the respective layers of the electric field or magnetic field. Here, the effective refractive indices are complex numbers and become functions of the thickness of the #7059 glass layer 4 and the SiO$_2$ layer 3.

(b) A field distribution h(x) of the incident light in the incident light traveling direction (represented by x) within the optical waveguide and a field distribution f(x) of the optical coupler in the incident light traveling direction are obtained. Here, h(x) and f(x) are given by the following equations:

$$h(x) = \exp\{-x^2/(w_0/\cos\theta_i)^2\}$$

$$f(x) = \exp(-K_{TE}k_0 x)$$

where the incident angle $\theta_i$ of the light incident upon the surface of the optical waveguide 6 is obtained from the real parts $N_{TE}$ and $N_{TM}$ of the effective refractive indices with respect to the TE light and the TM light by using $\theta_i = \sin^{-1}\{(N_{TE}+N_{TM})/2n_q\}$; $w_0$ is a beam diameter of the incident light; and $K_{TE}$ and $K_{TM}$ are imaginary parts of the effective refractive indices. h(x) and f(x) also become functions of the thickness of the #7059 glass layer (first dielectric layer) 4 and the thickness of the SiO$_2$ layer (second dielectric layer) 3. Here, $k_0$ is $2\pi/\lambda$, and $K_{TE}$ is a function of the thickness of the first dielectric layer 4 and the second dielectric layer 3.

(c) A coupling efficiency η is obtained by using the equation:

$$\eta = \int |h(x)f(x)| dx / \{\int |f(x)|^2 dx \cdot \int |h(x)|^2 dx\}$$

In the case where $w_0$ is determined, the thickness of the #7059 glass layer 4 and the $SiO_2$ layer 3 is determined by repeating the above-mentioned operations of (a) to (c) so that the coupling efficiency becomes maximum.

Figure 5:
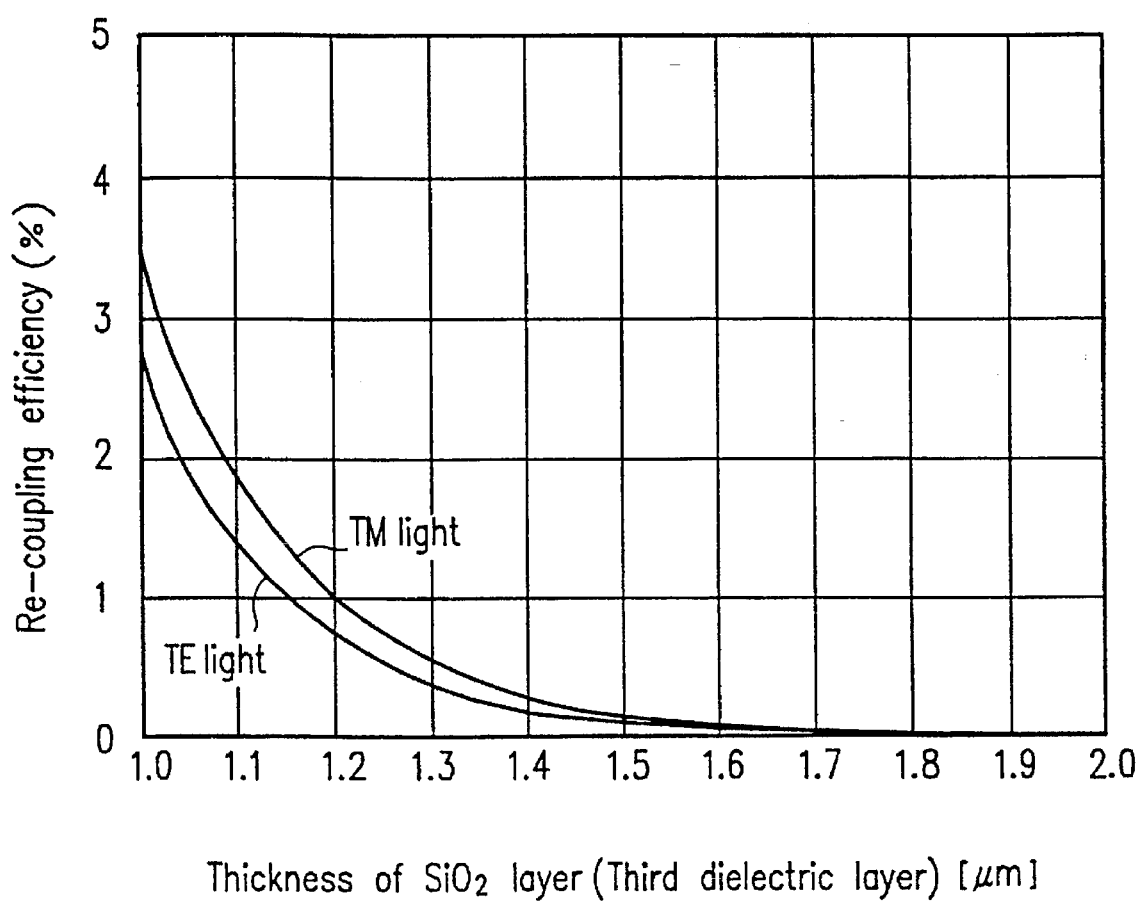
FIG. 5 is a graph showing re-coupling efficiency characteristics of the optical coupler according to the present invention and in Example 1.

In the case where an $SiO_2$ layer is used for the third dielectric layer 2, the thickness of the $SiO_2$ layer depends upon the changes in characteristics of a re-coupling efficiency with respect to the thickness of the third dielectric layer 2 shown in FIG. 5. The re-coupling refers to a phenomenon in which light incident upon the optical waveguide 6 is output therefrom when a part of the light introducing portion 1 is placed on the third dielectric layer 2, as shown in FIG. 1B. The re-coupling efficiency in FIG. 5 is defined as a ratio of light which has been incident upon the optical waveguide 6 and is output therefrom while propagating, assuming that the length of the dielectric portion on the third dielectric layer ($L_p$ of FIG. 1B) is 0.1 mm. The thickness of the $SiO_2$ layer (third dielectric layer 2) required for making the re-coupling efficiency less than 1% is determined to be 1.18 μm or more; in the present example, the thickness is determined to be 1.2 μm.

Next, the operation of the optical coupler of the present example will be described.

As described above, in the above-mentioned structure, light is allowed to be introduced into the optical waveguide 6. That is, the optical coupler functions based on the same principle as that of the prism coupler.

Light incident upon the boundary between the light introducing portion 1 on the second dielectric layer 3 and the third dielectric layer 2 from the light introducing portion 1 passes through the second dielectric layer 3 by a tunnel effect-like function and is incident upon the first dielectric layer 4. When reaching the boundary between the first dielectric layer 4 and the substrate 5, the light is totally reflected therefrom. Thereafter, the light travels to the second dielectric layer 3, and is incident upon the boundary between the first dielectric layer 4 and the second dielectric layer 3 at an angle satisfying the total reflection condition. In other words, at this portion, a tunnel effect-like function is not exhibited due to the presence of the third dielectric layer 2 on the second dielectric layer 3 and thus, the light is totally reflected. Thereafter, the light is repeatedly totally reflected to propagate through the optical waveguide 6.

Figure 4:
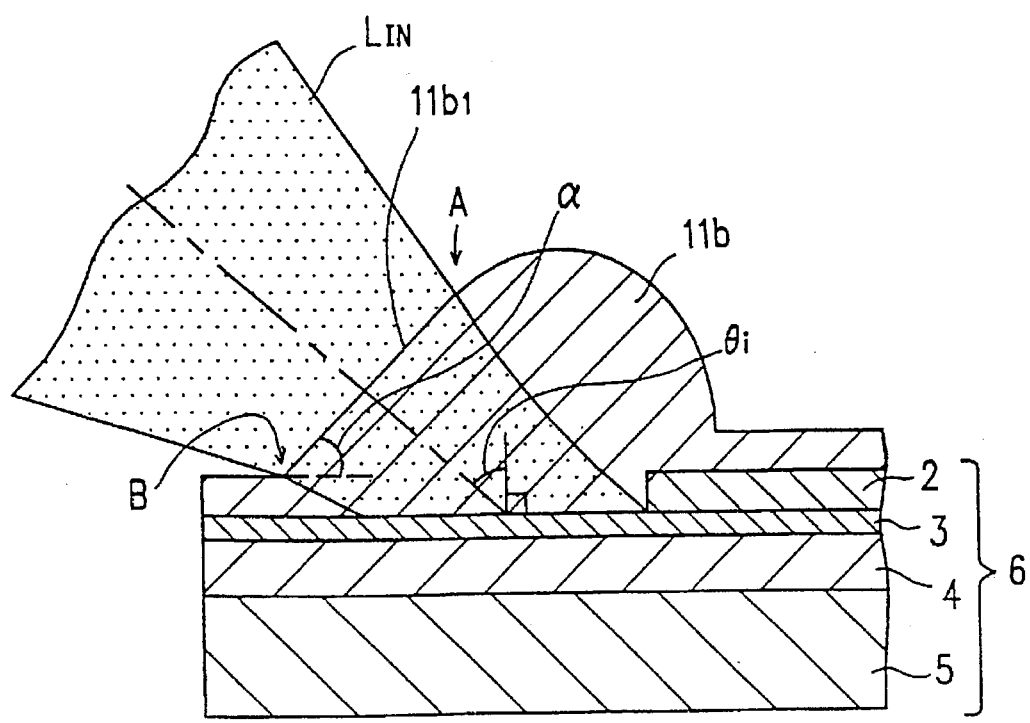
FIG. 4 is a cross-sectional view showing a second modified shape of the light introducing portion of the optical coupler according to the present invention and described in Example 1.

The light introducing portion 1 formed on the optical waveguide 6 is not limited to a trapezoid with its right and left sides sloped as shown in FIG. 1B. The light introducing portion 1 may be in a prism shape of the light introducing portion 11a (FIG. 3) with one of its sides vertical to a base or in a prism shape of the light introducing portion 11b (FIG. 4) with one flat surface $11b_1$ (surface represented by AB in FIG. 4) at least corresponding to the incident surface of light. The shape of the light introducing portion 1 does not affect the performance of the optical coupler.

The materials for the substrate 5, the first dielectric layer 4 and the second dielectric layer 3 constituting the optical waveguide 6 are not limited to those as described above. For example, quartz glass is used for the substrate 5, and an SiON layer is used for the first dielectric layer 4. However, as far as the absorption loss is concerned, a Si substrate with a $SiO_2$ layer formed thereon is preferable as the substrate 5, and #7059 glass is preferable for the first dielectric layer 4 in terms of stability of a refractive index.

PSG (phospho-silicate glass capable of being formed into a film by CVD), SOG (glass capable of being coated with a spinner and cured by heating), etc. can also be used for the second dielectric layer 3. However, the thickness of the second dielectric layer 3 greatly affects the optimum beam diameter of incident light, so that an $SiO_2$ layer is preferable in terms of controllability of the thickness of the second dielectric layer 3.

Furthermore, materials having a refractive index equal to or lower than that of the second dielectric layer 3 can be used for the third dielectric layer 2. However, in the present example, the third dielectric layer 2 is also made of $SiO_2$ having a refractive index equal to that of the $SiO_2$ layer of the second dielectric layer 3 for the purpose of preventing the reflection at the boundary between the second dielectric layer 3 and the third dielectric layer 2.

Hereinafter, a method for producing the optical coupler shown in FIGS. 1A and 1B will be described.

FIGS. 6A and 6B and FIGS. 7A through 7C are cross-sectional views showing the steps of a method for producing the optical coupler. FIG. 6C is a plan view corresponding to the cross-sectional view of FIG. 6B. FIGS. 8A and 8B illustrate a molding member (hereinafter, referred to as a stamper) used for producing the optical coupler. FIG. 8A shows a molding surface of the stamper, and FIG. 8B shows a structure of the stamper in cross-section.

Figure 6A:
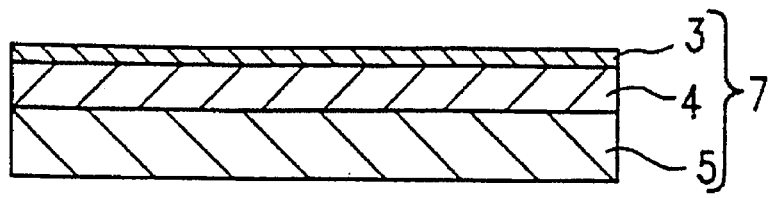
FIGS. 6A, 6B and 6C illustrate a method for producing the optical coupler according to the present invention and in Example 1.
Figure 6B:
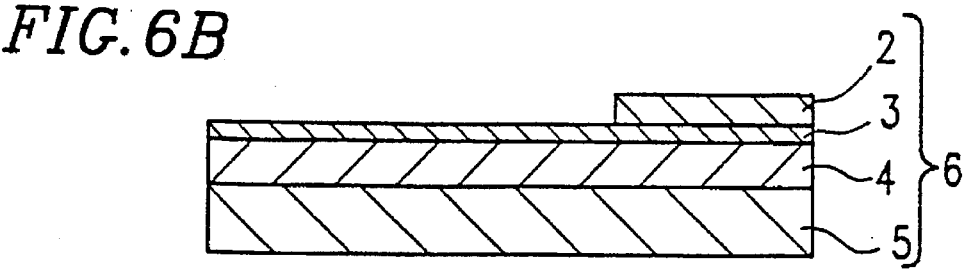
Figure 6C:
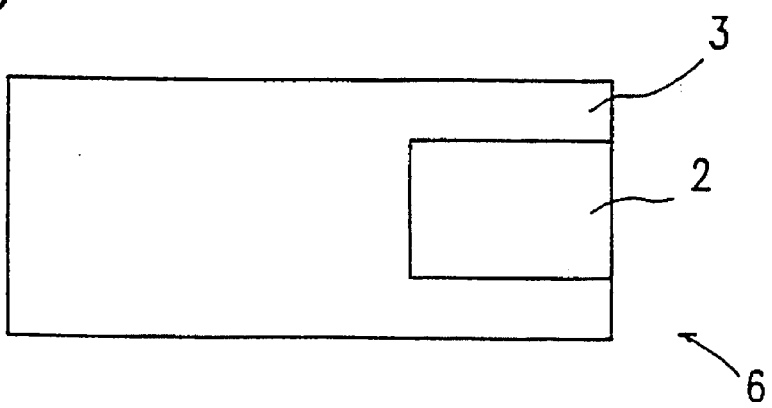

As shown in FIG. 6A, the first dielectric layer 4 and the second dielectric layer 3 are formed on the substrate 5 in this order to form the optical waveguide body 7. Then, an $SiO_2$ layer is formed as the third dielectric layer 2 on a part (portion surrounded by XYX'Y' of FIG. 1A) of the optical waveguide body 7 to form the optical waveguide 6 (FIG. 6B).

Then, a light introducing portion is formed in a desired shape with resin. During this step, a molding technique is used. As the molding technique, various methods such as injection molding and extrusion molding can be used. In the present example, a 2P method is used, which is advantageous for enhancing the surface precision of the incident surface of light.

Hereinafter, the 2P method will be described.

As a mold, a stamper 8 (which is also called a master) as shown in FIGS. 8A and 8B is used. The stamper 8 has a groove 9 with a desired shape in cross-section. As shown in FIGS. 8A and 8B, the stamper 8 is designed so as to have two slopes 9a and 9b corresponding to the side shape of the light introducing portion 1 of FIG. 1B. This is because the optical coupler to be produced can be easily removed from the stamper 8.

Figure 7A:
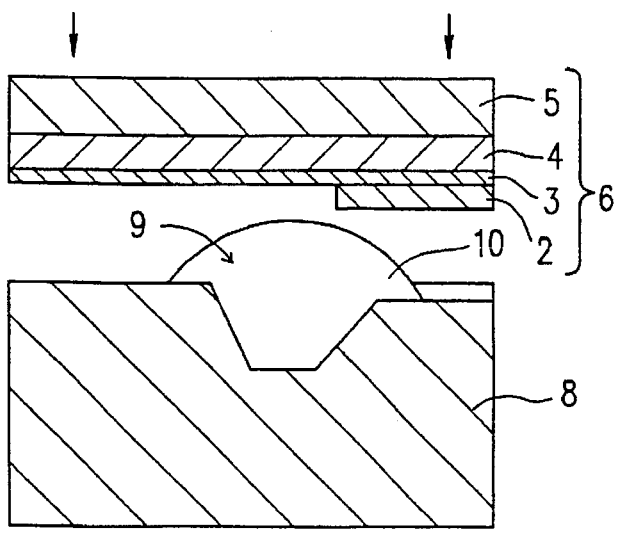
FIGS. 7A, 7B and 7C illustrate the process for forming a dielectric region by molding resin in the order of steps in a method for producing the optical coupler according to the present invention and described in Example 1.
Figure 7B:
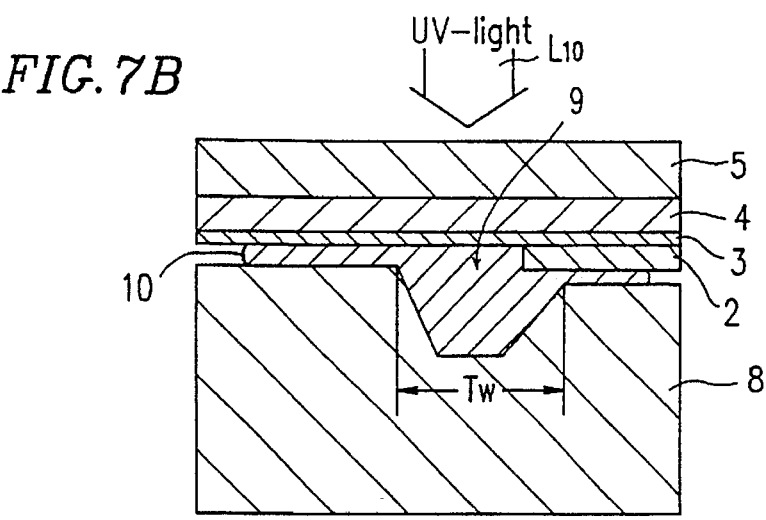
Figure 7C:
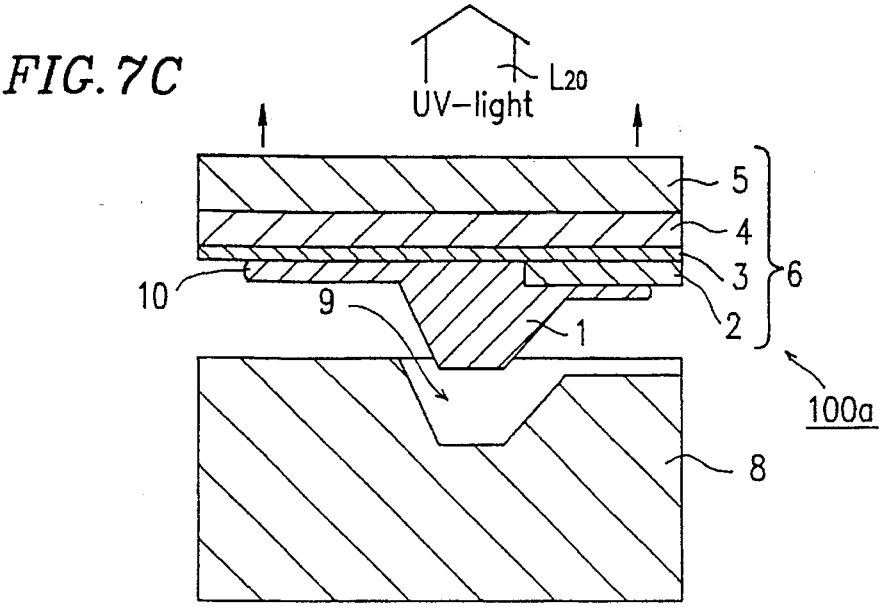
Figure 8A:
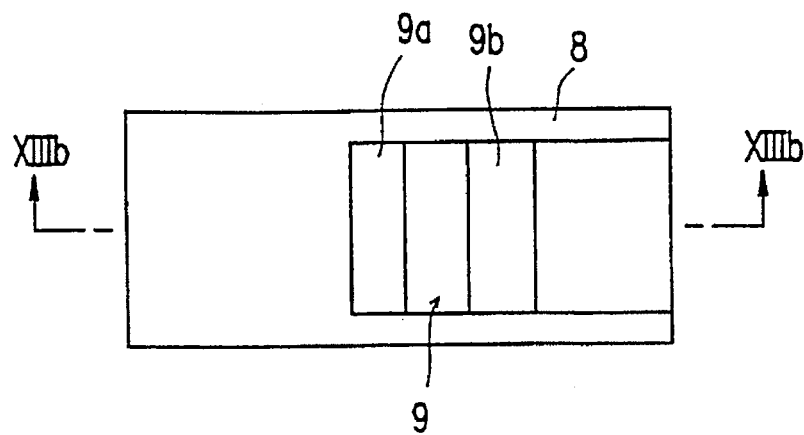
FIGS. 8A, 8B and 8C illustrate the structure of the stamper used for producing the optical coupler according to the present invention and described in Example 1.
Figure 8B:
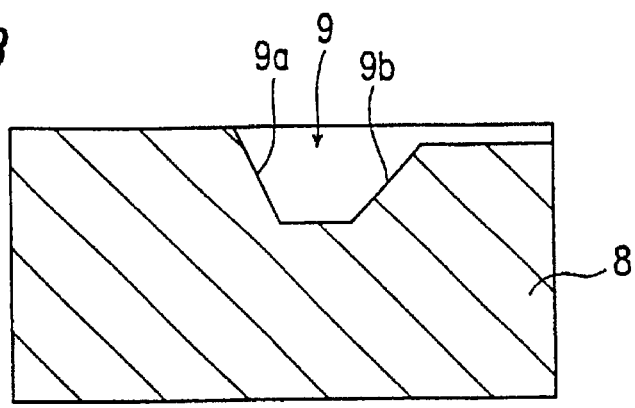

FIGS. 7A through 7C show a specific procedure of the 2P method. As shown in FIG. 7A, UV-curable resin 10 for molding the light introducing portion 1 is supplied to the groove 9 of the stamper 8 and the periphery thereof. The optical waveguide 6 is pressed against the stamper 8 so that the UV-curable resin 10 covers the boundary XY between a portion where the $SiO_2$ layer (the third dielectric layer 2) is present and a portion where the $SiO_2$ layer is not present. Then, the optical waveguide 6 and the stamper 8 are irradiated with UV-light, as shown in FIG. 7B. After being cured by the irradiation of UV-light, the UV-curable resin 10 is detached from the stamper 8, as shown in FIG. 7C, whereby the optical coupler 100a having the light introducing portion 1 in a desired shape can be produced.

The method for irradiating UV-light shown in FIG. 7B and the material for the stamper 8 are slightly varied depending upon what is used for the substrate 5 of the optical waveguide 6. This is described as follows:

1) Case where a glass substrate is used:

When a stamper made of glass is used, UV-light $L_{10}$ is radiated to the optical waveguide 6 and UV-light $L_{20}$ is radiated to the stamper 8 as shown in FIG. 7B. When a stamper made of metal is used, only UV-light $L_{10}$ is radiated to the optical waveguide 6. The irradiation time of UV-light is shorter when the stamper made of glass is used than when the stamper made of metal is used.

2) Case where a Si substrate having a $SiO_2$ layer obtained by thermally oxidizing the surface of the Si substrate is used:

Only a glass stamper (glass master) can be used. Only the irradiation of UV-light $L_{20}$ to the stamper is possible.

A width $T_w$ of the groove 9 in the stamper 8 is preferably set so that the UV-curable resin 10 stops in the middle of the third dielectric layer 2 when the optical waveguide 6 is pressed against the stamper 8 as shown in FIG. 7B. Because of this, when the UV-curable resin 10 reaches the portion where the third dielectric layer 2 is not present, light loss is prevented from occurring at that portion due to re-coupling (i.e., output of light from the optical waveguide 6).

Figure 8C:
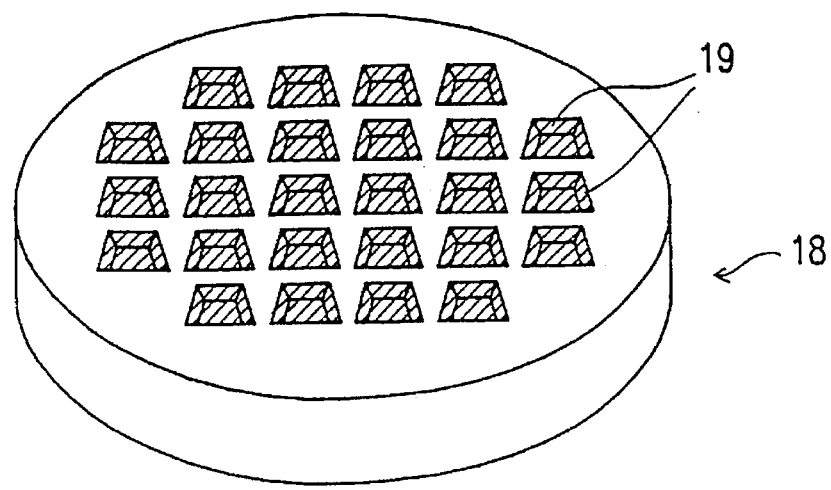

In the case where light introducing portions are simultaneously produced in a plurality of optical waveguides on one substrate in order to fabricate a plurality of optical couplers at one time, optical couplers can be simultaneously provided by using a stamper 18 with a required number of identical grooves 19 formed thereon as shown in FIG. 8C in accordance with the procedure of FIGS. 7A through 7C.

Finally, a specific example of the shape of the light introducing portion of the present example will be described.

In the present example, UV-curable methacrylate (refractive index $n_q$=1.57) is used for the light introducing portion 1 and the light introducing portion 1 is formed on the optical waveguide 6. Thus, the effective refractive indices $N_{TE}$ and $N_{TM}$ of TE light and TM light become 1.4852 and 1.4842, respectively, assuming that the wavelength λ of incident light is 780 nm. Here, the optical waveguide 6 includes a Si substrate having a $SiO_2$ layer (refractive index=1.44) formed by thermally oxidizing the surface of the Si substrate, the first dielectric layer 4 made of #7059 glass (refractive index=1.53; thickness=570 nm), the second dielectric layer 3 made of $SiO_2$ (refractive index=1.43; thickness=100 nm), and the third dielectric layer 2 (thickness=1.2 µm).

Figure 9:
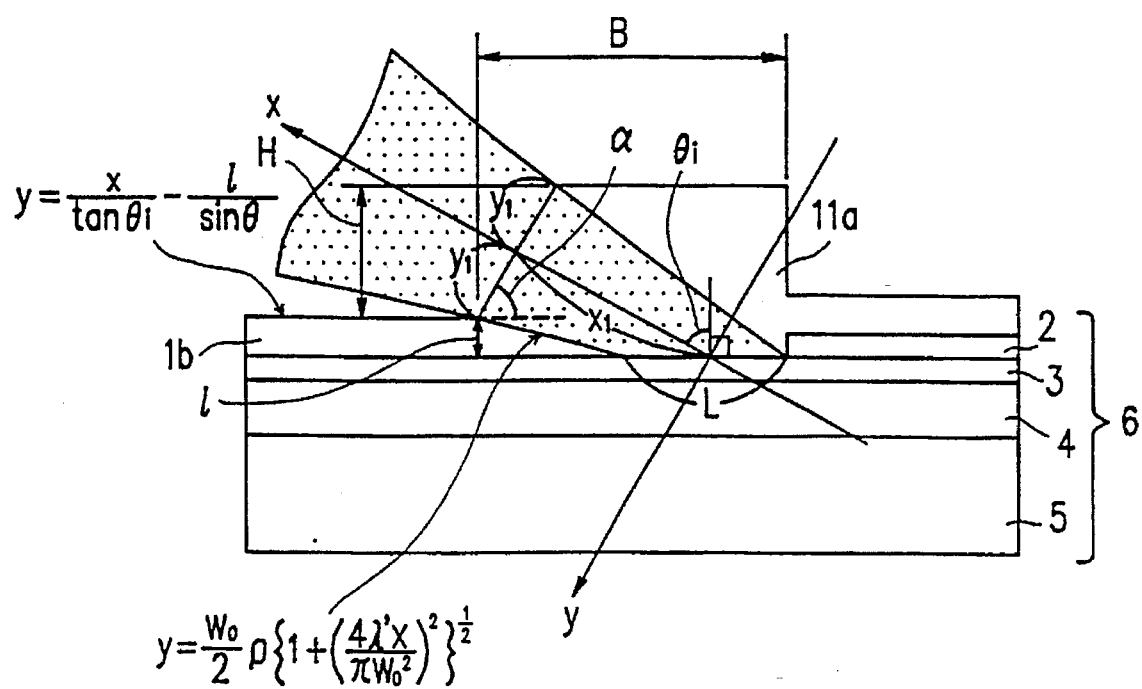
FIG. 9 shows a calculation model for calculating the size and shape of the optical coupler in Example 1 according to the present invention, in which an x-y coordinate system is set in a cross-sectional shape of the optical coupler.

In the case where the light introducing portion 1 in a shape as shown in FIGS. 1A and 1B is formed with resin (refractive index $n_q$), it is considered that a resin layer 1b with a certain thickness adheres to the second dielectric layer 3. In this case, assuming that the thickness of the adhering resin layer 1b is 1, Expressions (1) and (2) can be rewritten as below by using a model in FIG. 9. In the model of FIG. 9, the shape of the light introducing portion corresponds to that of the light introducing portion 11a (FIG. 3) with one of its sides vertical to a base, the origin of an x-y coordinate system is set to be a point where the optical axis of incident light crosses the surface of the second dielectric layer 3, and an x-axis is matched with the optical axis of the incident light.

$$B > x_1/\sin \theta_i - l/\tan \theta_i + L/2 \quad (6)$$

$$H > 2y_1 \sin \theta_i + l \quad (7)$$

$$L = p w_0/[\cos \theta_i \{1-(4p^2\lambda^2 \tan^2 \theta_i/n_q^2 \pi^2 w_0^2)\}^{1/2}] \quad (8)$$

$$x_1 = \{-b_1 + (b_1^2 - a_1 c_1)^{1/2}\}/a_1 \quad (9)$$

$$y_1 = x_1/\tan \theta_i - l/\sin \theta_i \quad (10)$$

$$a_1 = 1/\tan^2 \theta_i - 4\lambda^2 p^2/n_q^2 \pi^2 w_0^2 \quad (11\text{-a})$$

$$b_1 = -l/\sin \theta_i \cos \theta_i \quad (11\text{-b})$$

$$c_1 = l^2/\sin^2 \theta_i - w_0^2 p^2/4 \quad (11\text{-c})$$

When substituting the effective refractive indices $N_{TE}$ and $N_{TM}$ into Expression (4), an incident angle $\theta_i$ becomes 71°. Thus, a slope α of an incident surface is determined to be $\theta_i$ (i.e., 71°) so that the reflectivity on the incident surface will be minimum.

Assuming that the thickness of the resin layer 1b adhering to the surface of the optical waveguide 6 is 3 µm, B>200.4 µm and H>116.1 µm are obtained from Expressions (6) and (7).

Thus, in the present example, the light introducing portion 1 made of resin provided on the optical waveguide 6 is formed so as to have a shape in cross-section as shown in FIGS. 1A and 1B having a slope α of 71° of an incident surface, a base B of 201 µm, and a height H of 117 µm.

As described above, in the present example, the optical waveguide 6 includes the substrate 5, the first dielectric layer 4 formed on the substrate 5, the second dielectric layer 3 formed on the first dielectric layer 4, having a refractive index lower than that of the first dielectric layer 4, and the third dielectric layer 2 formed on a part of the second dielectric layer 3, having a refractive index equal to that of the second dielectric layer 3. The light introducing portion 1 made of a material having a refractive index higher than that of the respective dielectric layer is disposed on the optical waveguide 6 so as to cover the boundary between a portion where the third dielectric layer 2 is present and a portion where the third dielectric layer 2 is not present. Because of this structure, light can be coupled to the optical waveguide 6 based on the coupling principle of prism couplers.

Moreover, when the distance B from the boundary between the light introducing portion 1 and the third dielectric layer 2 to a lower portion of the incident surface 1a of the light introducing portion 1 and the height H required for the incident surface 1a are determined from Expressions (6) and (7), to determine the shape of the light introducing portion 1, the thickness of the optical coupler including the optical waveguide 6 and the light introducing portion 1 can be made small in accordance with the incident beam diameter $w_0$.

Furthermore, the light introducing portion 1 is merely formed with a material having a high refractive index on the optical waveguide 6 so as to have a desired shape. Therefore, it is easier to produce an optical coupler, compared with the case where a prism is attached to an optical waveguide. Inexpensive resin can be used as a material having a higher refractive index, which results in a decrease in the production cost of an optical coupler.

Still furthermore, when resin (e.g., UV-curable resin) is used as a material having a high refractive index, a molding technique such as a 2P method can be used in the course of production of an optical coupler. Thus, a plurality of optical couplers can be simultaneously provided on a substrate with a plurality of identical optical waveguides formed thereon, by forming a plurality of identical grooves on a molding stamper.

EXAMPLE 2

Figure 10A:
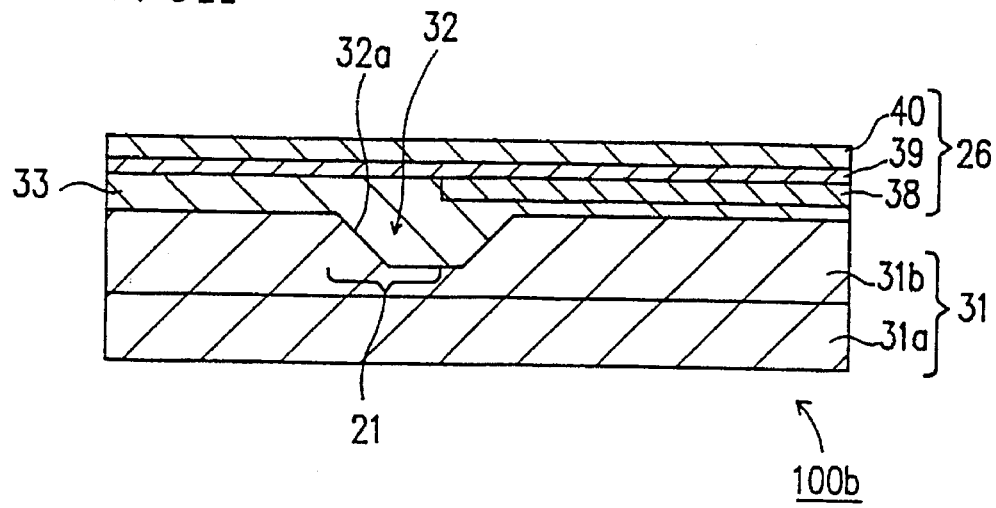
FIGS. 10A and 10B illustrate the structure of an optical coupler according to the present invention and described in Example 2.
Figure 10B:
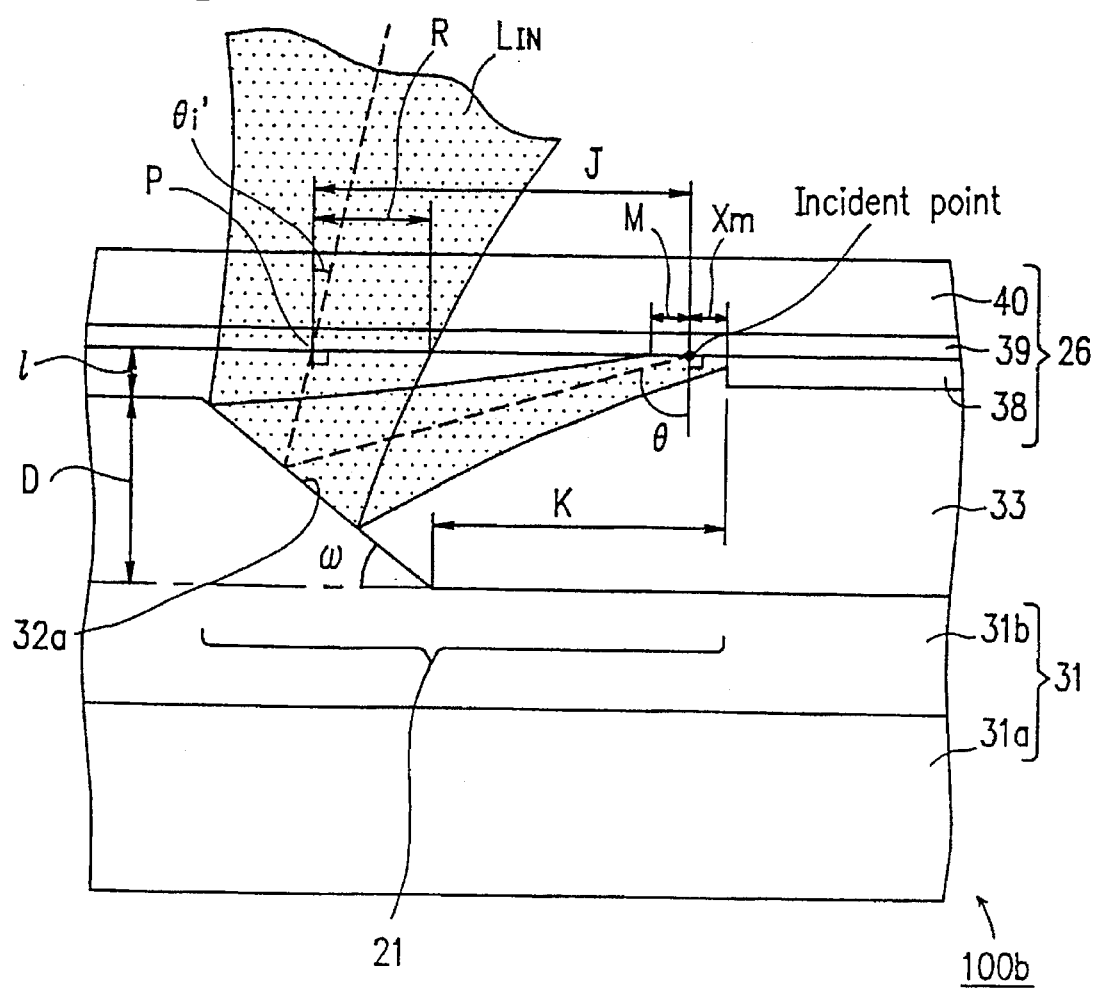

FIGS. 10A and 10B illustrate another embodiment of an optical coupler according to the present invention. FIG. 10A is a cross-sectional view of the optical coupler, and FIG. 10B shows an enlarged light introducing portion of the optical coupler.

Referring to these figures, an optical coupler 100b includes a substrate 31 provided with a groove 32 having a reflective surface 32a for reflecting incident light and a dielectric region 33 formed on the substrate 31 so as to fill the groove 32. The optical coupler 100b further includes a first dielectric layer 38 formed on the surface of the dielectric region 33 so that its end is positioned above the groove 32, a second dielectric layer 39 formed on the dielectric region 33 and the first dielectric layer 38, and a third dielectric layer 40 formed on the second dielectric layer 39. The first, second, and third dielectric layers 38, 39, and 40 form an optical waveguide 26, and the reflective surface 32a of the groove 32 and the dielectric region 33 in the groove 32 form a light introducing portion 21 for introducing incident light into the optical waveguide 26.

A Si substrate 31a with an Al reflective film 31b formed thereon is used as the substrate 31. The groove 32 is formed on the surface of the Al reflective film 31b. A refractive index $n_1$ of the first dielectric layer 38, a refractive index $n_q$ of the dielectric region 33, a refractive index $n_2$ of the second dielectric layer 39, and a refractive index $n_3$ of the third dielectric layer 40 are set so that the refractive index $n_q$ is higher than the refractive indices $n_1$, $n_2$, and $n_3$, and $n_1 \leq n_2$ and $n_2 < n_3$ are satisfied.

In the case of the optical coupler 100b of this example, incident light is coupled to the optical waveguide 26 and propagates therethrough by the following principle of a prism coupler.

Light incident upon the surface of the third dielectric layer 40 as shown in FIG. 10B passes through the third dielectric layer 40, the second dielectric layer 39, and the dielectric region 33. Then, the light is reflected from the reflective surface 32a of the Al reflective film 31b and is incident upon the second dielectric layer 39 in the vicinity of a boundary between the first dielectric layer 38 and the dielectric region 33. The light is incident upon the second dielectric layer 39 at an angle equal to or larger than the total reflection angle with respect to the lower surface of the second dielectric layer 39 and passes through the second dielectric layer 39 by a tunnel effect-like function to be incident upon the third dielectric layer 40.

Then, the light is totally reflected from a boundary between the third dielectric layer 40 and air and travels to the second dielectric layer 39. However, due to the presence of the second dielectric layer 39 and the thick first dielectric layer 38 between the dielectric region 33 and the third dielectric layer 40, the light cannot pass through the first dielectric layer 38, and is totally reflected to the third dielectric layer 40. Thereafter, the light propagates through the third dielectric layer 40 while repeating this total reflection.

Hereinafter, in order to describe the structure of the optical coupler 100b of this example in more detail, a method for producing the optical coupler 100b in FIGS. 10A and 10B will be described with reference to FIGS. 11A to 11D.

Figure 11A:
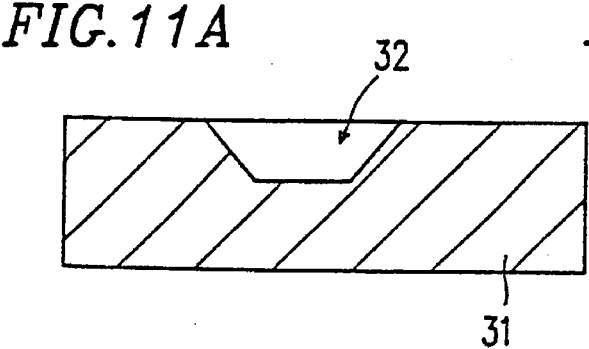
FIGS. 11A, 11B, 11C and 11d illustrate the steps of molding resin in a method for producing the optical coupler according to the present invention and described in Example 2.
Figure 11B:
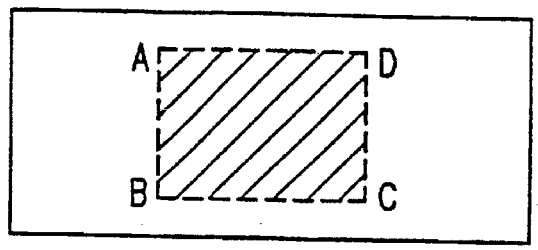
Figure 11C:
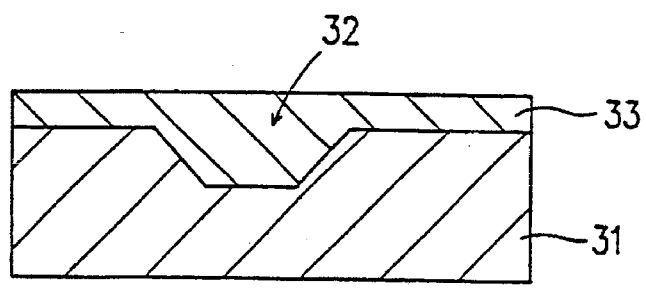
Figure 11D:
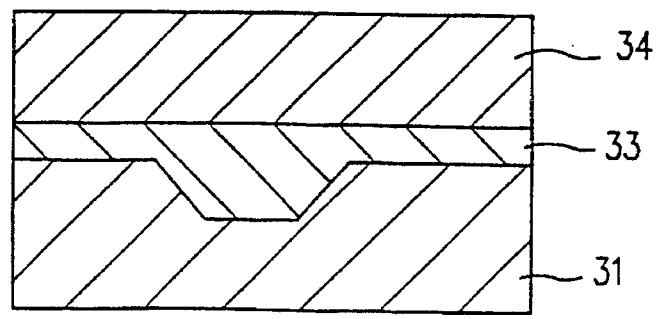

First, the groove 32 is formed on the substrate 31 with a metal film, such as an Al film, formed thereon, as shown in FIG. 11A. The groove 32 is formed in a region of the substrate 31 represented by ABCD in a plan view of FIG. 11B.

Thereafter, the dielectric region 33 is formed on the substrate 31. The dielectric region 33 can be produced with UV-curable resin by using a 2P method. More specifically, the groove 32 is filled with UV-curable resin (FIG. 11C), a glass stamper 34 is pressed against the substrate 31 (FIG. 11D), and the resin is cured by the irradiation of UV-light.

In the optical coupler 100b shown in FIGS. 10A and 10B, in order to provide an optical coupling function of the prism coupler, the dielectric region (UV-curable region) 33 is etched to form a groove 37, and the first dielectric layer 38 is formed so as to fill the groove 37. A method for forming the first dielectric layer 38 will be described with reference to FIGS. 12A to 12F. FIGS. 12A, 12C, 12D, and 12F are cross-sectional views and FIGS. 12B and 12E are plan views corresponding to FIGS. 12A and 12D.

Figure 12A:
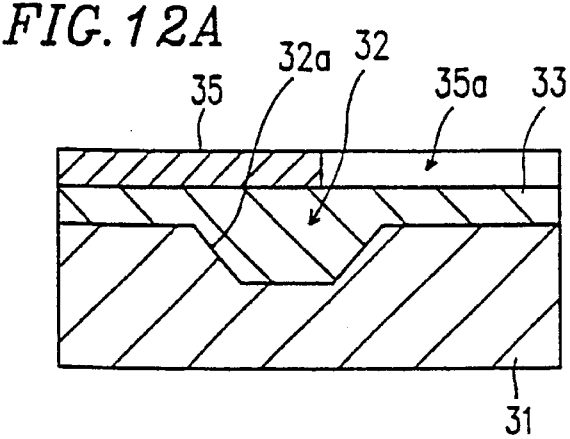
FIGS. 12A, 12B, 12C, 12D, 12E and 12F illustrate the steps of embedding a first dielectric layer into a resin molding portion in a method for producing the optical coupler according to the present invention and described in Example 2.
Figure 12B:
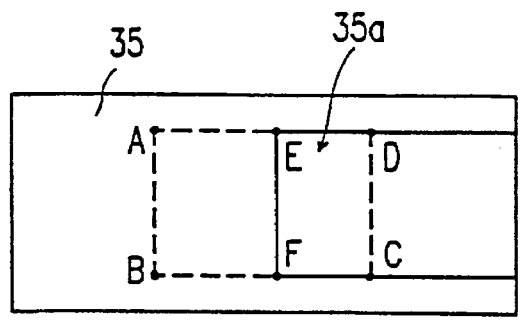

As shown in FIG. 12A, a metal film 35 is formed on the dielectric region 33 as a mask for selectively etching the dielectric region 33 to form a groove in which the first dielectric layer 38 will be buried. It will be described later how to determine an end portion of an opening window 35a of the metal film 35 (portion EF of FIG. 12B).

Figure 12C:
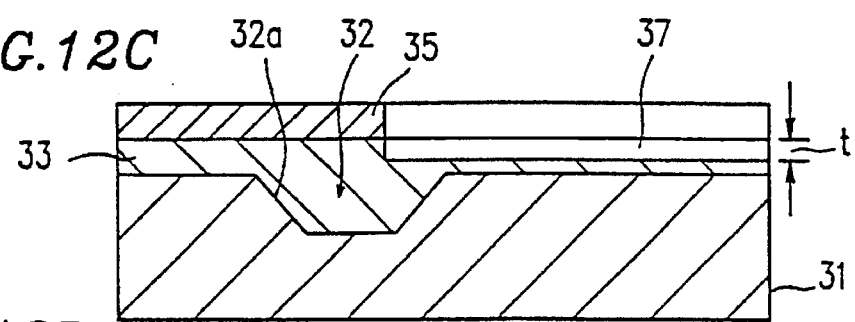
Figure 12D:
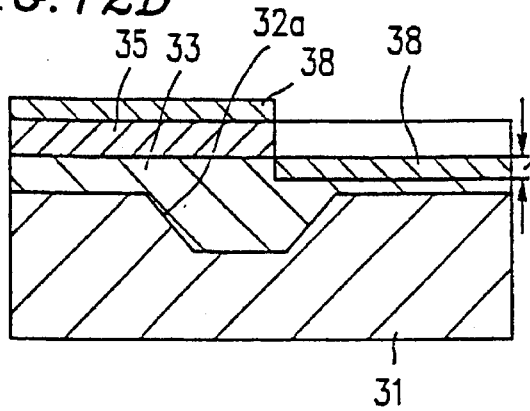
Figure 12E:
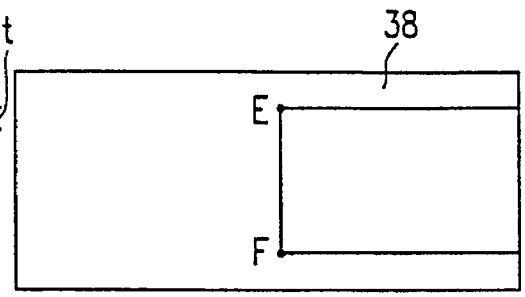
Figure 12F:
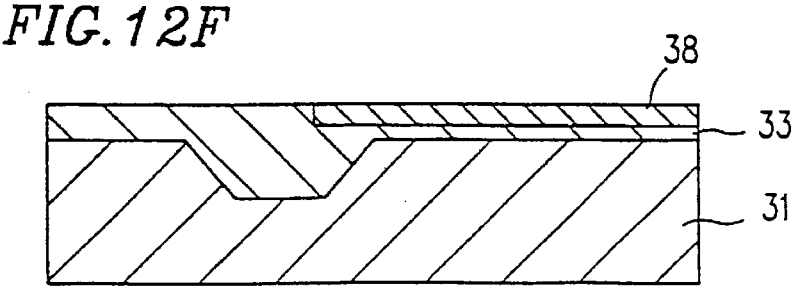

Next, as shown in FIG. 12C, the groove 37 with a desired depth t is formed in a portion corresponding to the opening window 35a of the metal film 35 by etching. Thereafter, as shown in FIGS. 12D and 12E, the first dielectric layer 38 with a thickness t is formed in the groove 37. Then, the metal film 35 is removed (FIG. 12F).

The second dielectric layer 39 and the third dielectric layer 40 are formed on the first dielectric layer 38 in this order, whereby the optical coupler 100b shown in FIGS. 10A and 10B is formed.

In the optical coupler 100b in FIGS. 10A and 10B, a refractive index $n_1$ of the first dielectric layer 38, a refractive index $n_q$ of the dielectric region 33, a refractive index $n_2$ of the second dielectric layer 39, and a refractive index $n_3$ of the third dielectric layer 40 are set so that the refractive index $n_q$ is higher than the refractive indices $n_1$, $n_2$, and $n_3$, and $n_1 \leq n_2$ and $n_2 < n_3$ are satisfied.

The shape of the groove 32 formed on the surface of the substrate 31 is defined by a thickness l of a portion of the dielectric region 33 which is not located on the groove 32 (FIG. 10B) and the position of the groove 37 formed in a part of the dielectric region 33 so as to accommodate the first dielectric layer 38.

Hereinafter, the conditions of the shape of the groove 32 formed on the surface of the substrate 31 and of the position of the groove 37 formed in the dielectric region 33 will be described with reference to FIG. 13.

Figure 13:
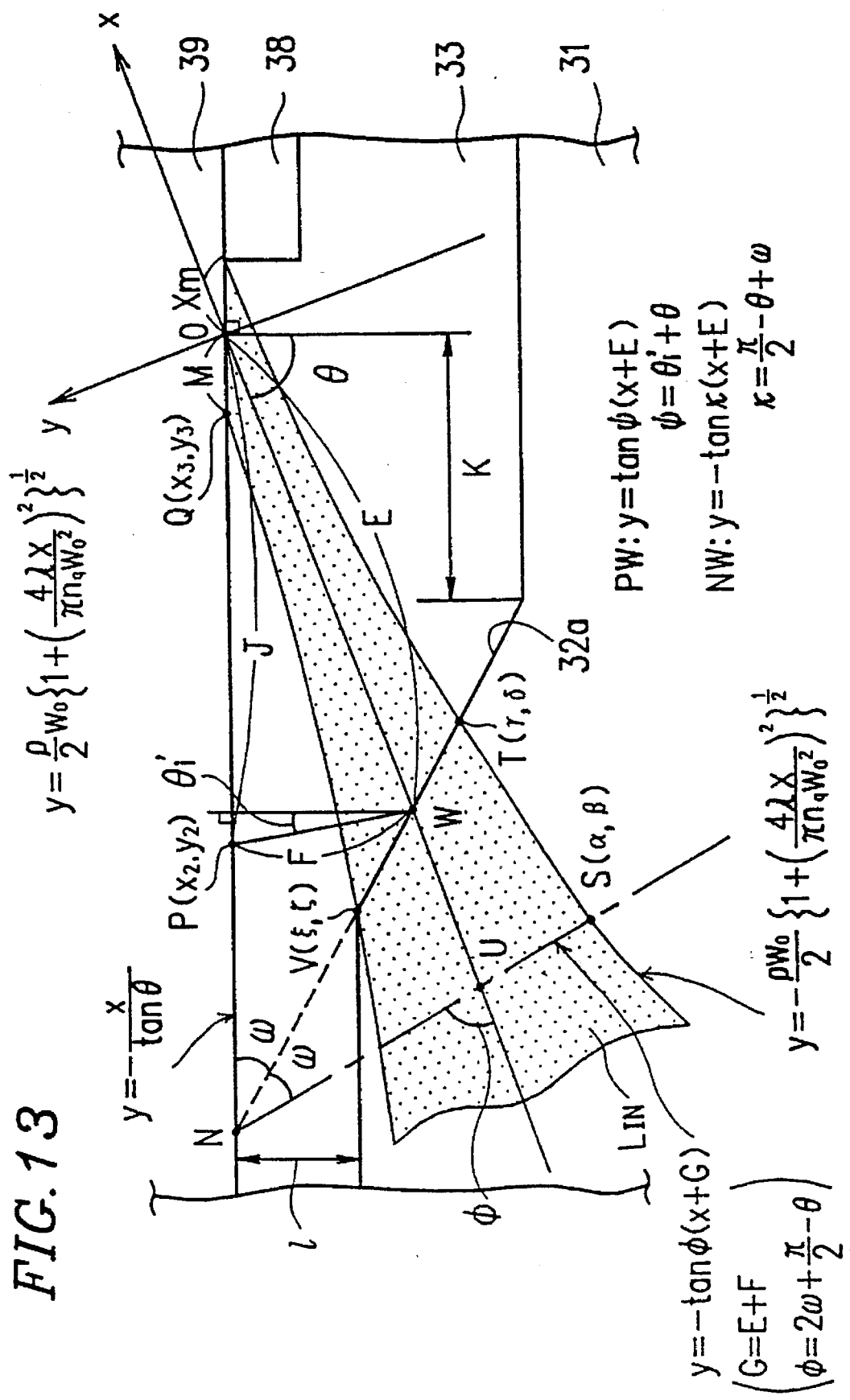
FIG. 13 shows a calculation model for calculating the size and shape of the optical coupler according to the present invention and described in Example 2, in which an x-y coordinate system is set in a cross-sectional shape of the optical coupler.

FIG. 13 shows an optical path of light $L_{IN}$ incident upon the optical coupler 100b shown in FIG. 10B. FIG. 13 shows an x-y coordinate system formed in FIG. 10B so that an origin is matched with an incident point of incident light with respect to the light introducing portion and an x-axis is matched with an optical axis of the incident light. It is understood from FIG. 10B that in order to avoid interference between the incident light and the light reflected from the reflective surface 32a of the groove 32, the following equation should be set:

$$J-R>M \qquad (12)$$

When the relationship among the incident light, the groove 32 on the surface of the substrate 31, and the groove 37 in the dielectric region 33 is represented as in FIG. 13, it is understood that a distance R shown in FIG. 10B is equal to a distance between two points S and U in FIG. 13. Expression (12) is stipulated by a beam diameter $w_0$ and a wavelength $\lambda$ of the incident light at a position P where the optical axis of the incident light crosses the surface of the dielectric region 33; the refractive index $n_q$ of the dielectric region 33; a propagation distance E of light from the reflective surface 32a to the incident point; an incident angle $\theta_i$ with respect to the surface of the dielectric region 33; and an incident angle $\theta$ with respect to the optical waveguide.

The distance E is determined by the thickness l of a portion of the dielectric region 33 where the groove 32 is not formed as shown in FIG. 10B and a slope ω of the reflective surface 32a is given by the following equation:

$$\omega = 0.5(\theta - \theta_i) \tag{13}$$

The distance E can be determined by obtaining a crossing point V (ξ, ζ) of a line y=−tan κ(x+E), which represents a straight line NW shown in FIG. 13 and a curve $y=(\rho w_0/2)\cdot\{1+(4\lambda x/n_q \pi w_0^2)^2\}^{1/2}$, which represents an upper edge line of a light beam on the drawing surface. The distance E can be represented by the following Expressions (14) to (17) and (18a) to (18c):

$$(-\xi/\tan\theta - \zeta)\sin\theta > l \tag{14}$$

$$\xi = \{-b_1 - (b_1^2 - a_1 c_1)^{1/2}\}/a_1 \tag{15}$$

$$\zeta = -\tan\kappa(x+E) \tag{16}$$

$$\kappa = \pi/2 - \theta + \omega \tag{17}$$

$$a_1 = \tan^2 \kappa - 4\rho^2 \lambda^2/n_q^2 \pi^2 w_0^2 \tag{18a}$$

$$b_1 = E \tan^2 \kappa \tag{18b}$$

$$c_1 = E^2 \tan^2 \kappa - \rho^2 w_0^2/4 \tag{18c}$$

In order to determine J in Expression (12), a coordinate of a point P $(x_2, y_2)$ is determined in the x-y coordinate system of FIG. 13. The point P is a crossing point of a straight line y=−x/tan θ, which represents a boundary between the dielectric region 33 and the second dielectric layer 39, and a straight line y=tan ψ(x+E) (ψ=θ$_i$'+θ), which connects an incident point P on the second dielectric layer 39 to an incident point W on the reflective surface 32a. Thus, the coordinate of the point P can be obtained as a solution of these simultaneous equations:

$$x_2 = -E\tan\psi\cdot(\tan\psi + 1/\tan\theta)^{-1} \tag{19}$$

$$y_2 = -x_2/\tan\theta \tag{20}$$

From FIG. 13, J is obtained by the following equation:

$$J = (x_2^2 + y_2^2)^{1/2} \tag{21}$$

The distance M is obtained from a coordinate Q $(x_3, y_3)$ of a crossing point Q of a straight line y=−x/tan θ, which represents a boundary between the dielectric region 33 and the second dielectric layer 39, and a curve $y=(\rho w_0/2)\cdot\{1+(4\lambda x/n_q \pi w_0^2)^2\}^{1/2}$, which represents an upper edge line of a light beam on the drawing surface.

$$x_3 = (-\rho w_0/2)/\{(1/\tan^2\theta) - (4\rho^2\lambda^2/n_q^2\pi^2 w_0^2)\}^{1/2} \tag{22}$$

$$y_3 = x_3/\tan\theta \tag{23}$$

The distance M in Expression (12) is given by:

$$M = |x_3(1 + 1/\tan^2\theta)| \tag{24}$$

Since being equal to |SU|, the distance R in Expression (12) can be obtained from the coordinates of the points S and R.

The point S is a crossing point of a straight line y=−tan φ(x+G), which is obtained by folding the boundary between the dielectric region 33 and the second dielectric layer 39 so as to be linearly symmetric with respect to an edge line of the reflective surface, and a curve $y=(-\rho w_0/2)\cdot\{1+(4\lambda x/n_q \pi w_0^2)^2\}^{1/2}$, which represents a lower edge line of a light beam on the drawing surface.

Here, G is equal to the sum of the distance E and the distance F, and is represented by the following equation:

$$G = (1+\cos\theta/\cos\theta_i')E \tag{25}$$

Assuming that the coordinate of the point S is S (α, β), α and β are represented as follows:

$$\alpha = \{-b_2 - (b_2^2 - a_2 c_2)^{1/2}\}/a_2 \tag{26}$$

$$\beta = -\tan\phi(\alpha + G) \tag{27}$$

$$\phi = \pi/2 + 2\omega - \theta \tag{28}$$

$$a_2 = \tan^2\phi - 4\lambda^2\rho^2/n_q^2\pi^2 w_0^2 \tag{29-a}$$

$$b_2 = G\tan^2\phi \tag{29-b}$$

$$c_2 = G^2\tan^2\phi - \rho^2 w_0^2/4 \tag{29-c}$$

Since the coordinate of the point U is (−G, 0), the distance R is obtained.

$$R = |SU| = \{(\alpha+G)^2 + \beta^2\}^{1/2} \tag{30}$$

When φ=π/2 [rad], i.e., 90°, the coordinate S (α, β) of the point S and the distance R are given as follows:

$$\alpha = -G \tag{31}$$

$$\beta = (-\rho W_0/2)\cdot\{1+(4\lambda\alpha/n_q\pi w_0^2)^2\}^{1/2} \tag{32}$$

$$R = |\beta| \tag{33}$$

The propagation distance E from the reflective surface to the incident point can be determined from Expressions (12), (21), (24), (30) (or (33)).

Furthermore, the condition of the depth of the groove 32 can be obtained from the value of the distance E. This condition can be determined by obtaining a crossing point T (γ, δ) of the straight line NW: y=−tan κ(x+E) and the curve $y=(-\rho w_0/2)\cdot\{1+(4\lambda x/n_q\pi w_0^2)^2\}^{1/2}$, which represents a lower edge line of a light beam on the drawing surface. Assuming that the depth of the groove 32 on the surface of the substrate 31 is D, D is represented as follows:

$$D \leq E\cos\theta - l + \{(\gamma+E)^2 + \delta^2\}^{1/2}\sin\omega \tag{34}$$

$$\gamma = \{-b_1 - (b_1^2 - a_1 c_1)^{1/2}\}/a_1 \tag{35}$$

$$\delta = -\tan\kappa(\gamma + E) \tag{36}$$

A distance K in FIG. 13, i.e., a distance between an edge (represented by a line AB of FIG. 12B) of the groove 32 on the surface of the substrate 31 in FIG. 12A and an edge (represented by a line EF of FIG. 12B) of the groove 37 formed in the dielectric region 33 provided so as to fill the groove 32 can be determined by the following expressions:

$$K = E_0\sin\theta - \{(\gamma_0 + E_0)^2 + \delta_0^2\}^{1/2}\cos\omega + x_m \tag{37}$$

$$\gamma_0 = \{-b_{10} - (b_{10}^2 - a_{10}c_{10})^{1/2}\}/a_{10} \quad (38)$$

$$\delta_0 = -\tan \kappa (\gamma_0 + E_0) \quad (39)$$

$$a_{10} = \tan^2 \kappa - 4\rho^2\lambda^2/n_q^2\pi^2 w_0^2 \quad (40\text{-a})$$

$$b_{10} = E_0 \tan^2 \kappa \quad (40\text{-b})$$

$$c_{10} = E_0^2 \tan^2 \kappa - \rho^2 w_0^2/4 \quad (40\text{-c})$$

where $D_0$ is a depth of the groove 32 determined when Expression (34) is an equality; $E_0$ is a propagation distance from the reflective surface 32a to the incident point O; a coordinate of a crossing point T is $(\gamma_0, \delta_0)$; and $X_m$ is a distance between the edge of the first dielectric layer 38 and the incident point O.

The value of K can also be determined by the following expression:

$$K = E_0 \sin \theta - \{(\gamma_0 + E_0)^2 + \delta_0^2\}^{1/2} \cos \omega + x_m - (D_1 - D_0)/\tan \omega \quad (41)$$

where $E_0$ is a propagation distance from the reflective surface 32a to the incident point O, and $D_1$ is a depth satisfying Expression (34) under this condition.

According to Expression (37), there is an effect that the groove 32 shown in FIG. 11A can be made as shallow as possible in the course of production of a coupler. According to Expression (41), although the groove 37 in which the first dielectric layer 38 is buried and the groove 32 having the reflective surface 32a become deep, the groove 37 can be easily aligned with the groove 32.

Hereinafter, a specific example of the above-mentioned optical coupler will be described.

There is no particular limit to the structure of the substrate 31 of the optical coupler 100b shown in FIGS. 10A and 10B. Any substrate such as a metal substrate and a substrate with a metal reflective film formed thereon can be used as long as a reflective film can be formed. Substrates having a high reflectivity on their surfaces are preferable. In the present example, the Si substrate 31a with the Al film 31b formed thereon is used, and the groove 32 is formed on the surface of the Al film 31b on the Si substrate 31a. Furthermore, there is no particular limit to the dielectric region 33 as long as it satisfies the condition of a refractive index. In the present example, UV-curable methacrylate resin (refractive index $n_q = 1.57$; wavelength $\lambda = 780$ nm) is used.

The optical waveguide 26 is constituted by the first dielectric layer 38, the second dielectric layer 39, and the third dielectric layer 40. PSG, SOG, or the like as well as $SiO_2$ ($n_1 = 1.43$; wavelength $\lambda = 780$ nm) can be used for the first dielectric layer 38; however, in the present example, $SiO_2$ is used. Because of the relationship of the refractive indices of the respective dielectric layers, $SiO_2$ ($n_2 = 1.43$; wavelength $\lambda = 780$ nm) is used for the second dielectric layer 39. #7059 glass, SiON, or the like can be used for the third dielectric layer 40; however, in the present example, #7059 glass ($n_3 = 1.53$; wavelength $\lambda = 780$ nm) is used.

Figure 14:
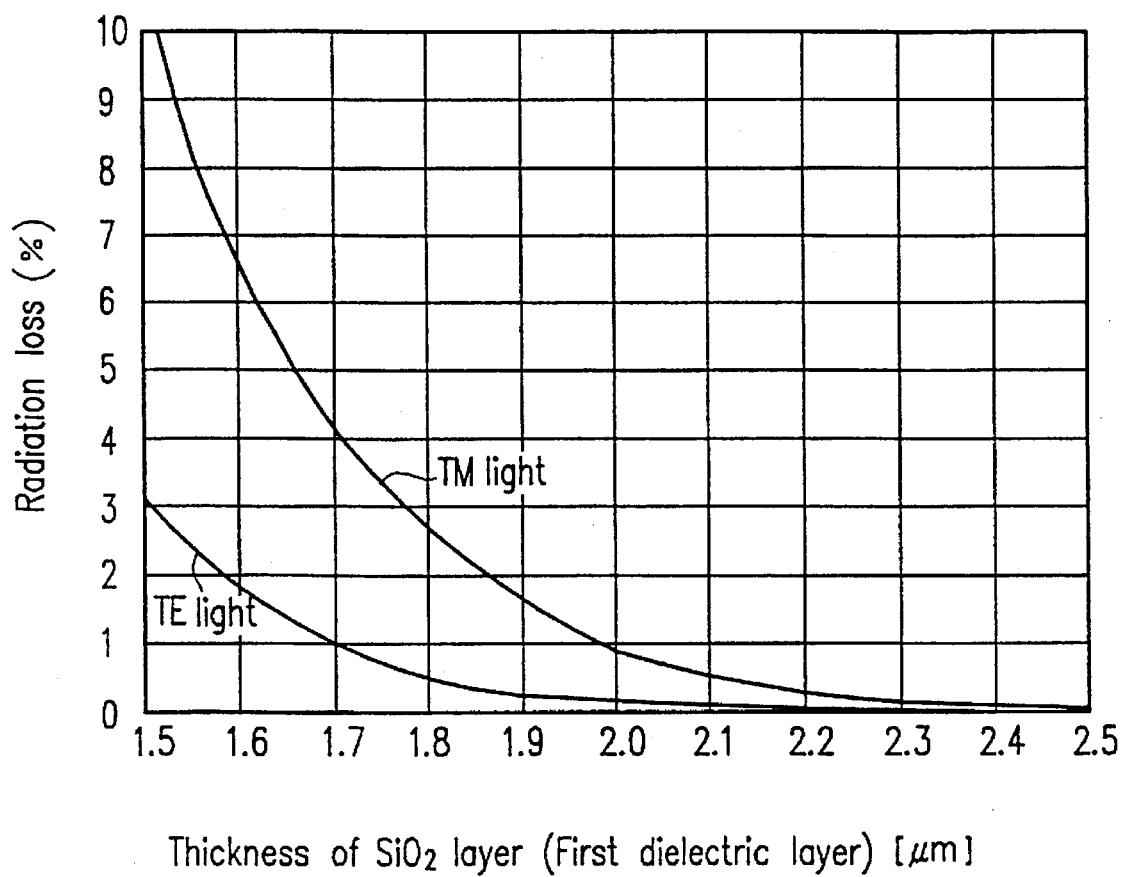
FIG. 14 is a graph showing radiation loss characteristics in the optical coupler according to the present invention and described in Example 2.

The following case will now be considered: a light beam having a beam diameter $w_0$ of 3.76 μm at a beam waist is incident so that a focal point is positioned as shown in FIG. 10B. In this case, if the thickness of a $SiO_2$ layer as the second dielectric layer 39 is set to be 200 nm and that of a #7059 glass layer as the third dielectric layer 40 is set to be 570 nm, the effective refractive indexes $N_{TE}$ and $N_{TM}$ of the TE light and the TM light in the optical coupler 100b become 1.4607 and 1.4696, respectively. Furthermore, the thickness t of the first dielectric layer 38 is determined so that a radiation loss (i.e., a ratio of light going outside the optical coupler while propagating to the substrate 31) is restricted. For example, in the case where the optical waveguide length is 1 mm, the thickness t has a relationship with the radiation loss as shown in FIG. 14. In the present example, the thickness t is set to be 2 μm so that the radiation loss is less than 1% under the condition that the optical waveguide length is 1 mm.

In the case of constructing the optical waveguide 26 by setting the parameters as described above, the angle ω of the reflective surface 32a of the groove 32 directly formed on the substrate 31 is obtained as follows:

The incident angle θ with respect to the optical waveguide 26 is determined by the following equation:

$$\theta = \sin^{-1} \{(N_{TE} + N_{TM})/2n_q\} \quad (42)$$

therefore, θ becomes 68.9°. Assuming that $\theta_i'$ is 0°, the angle ω of the reflective surface 32a with respect to the substrate 31 becomes 34.45° from Expression (13).

The groove 32 on the surface of the substrate 31 is filled with the dielectric region 33 made of UV-curable resin, and the thickness l of the resin layer above the surface of the substrate 31 is assumed to be 3 μm. A depth D of the groove 32 is determined based on the beam diameter $\omega_0$ at a converging point, the incident angle θ (=68.9°) with respect to the optical waveguide 26, and $\theta_i'$ (=0°).

From Expressions (12), (21), (24), and (30), the propagation distance E of light from the reflective surface 32a to the incident point O becomes 10.9 μm or more. If the propagation distance E is set to be 11 μm, it is required from Expression (34) that the depth D of the groove be 2.78 μm or more.

In the present example, the angle of the reflective surface 32a with respect to the surface of the substrate 31 is set to be 35.45° and the depth D is set to be 3 μm. The distance K between the edge of the bottom surface of the groove 32 on the surface of the substrate 31 shown in FIG. 12C and the edge (edge of the first dielectric layer 38 in FIG. 10A) of the groove 37 formed in the dielectric region 33 provided so as to fill the groove 32 is determined to be 11.3 μm by Expression (41). Here, the distance K is obtained under the condition that a distance $x_m$ between the incident point and the edge of the first dielectric layer 38 of FIG. 10A is 4 μm.

As described above, in Example 2, the groove 32 having the reflective surface 32a for reflecting incident light is formed on the substrate 31 and a material (for the dielectric region 33) having a higher refractive index than that of the substrate 31 is formed so as to fill the groove 32. Thereafter, the groove 37 is provided in the dielectric region 33 with a high refractive index for the purpose of providing a function corresponding to the edge of a prism in a prism coupler. Then, the groove 37 is filled with the first dielectric layer 38, and the second dielectric layer 39 and the third dielectric layer 40 are formed in this order on the dielectric region 33 in which the first dielectric layer 38 is buried. Therefore, light can be coupled to the optical waveguide 26 by using a coupling principle of a prism coupler. Furthermore, since there are no projections on the surface of the optical waveguide 26, the optical coupler can be made thinner and smaller, compared with the case where a light introducing portion in a desired shape is formed on the optical waveguide element with resin.

EXAMPLE 3

Figure 15:
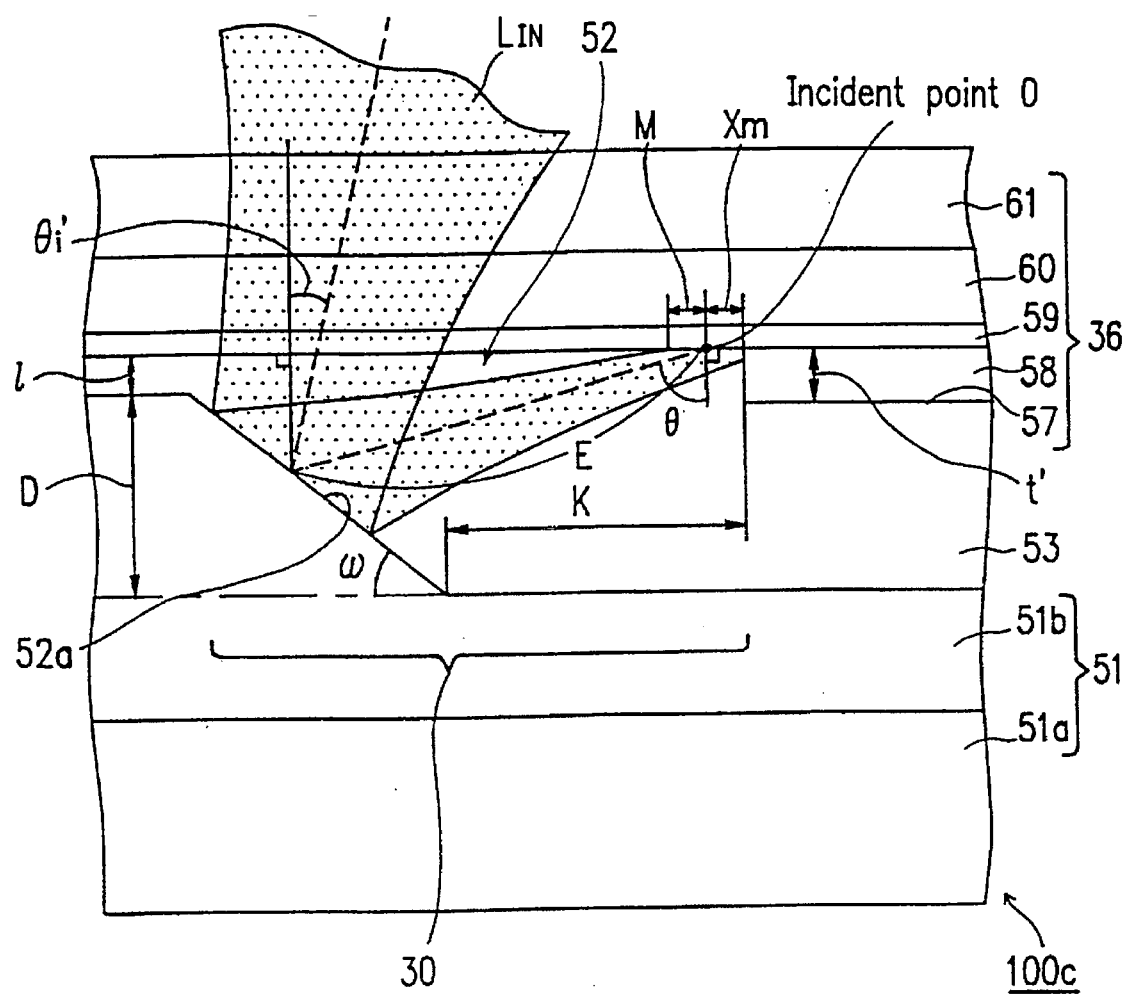
FIG. 15 shows the structure of an optical coupler according to the present invention and described in Example 3, illustrating how incident light is introduced into an optical waveguide through the optical coupler.

FIG. 15 illustrates a third embodiment of an optical coupler according to the present invention. Referring to this figure, a fourth dielectric layer 61 is formed on the third dielectric layer included in the optical coupler 100b of Example 2. The optical coupling principle in the optical coupler 100c is also based on the coupling principle of a prism coupler similar to that of Example 2. A substrate 51, a dielectric region 53, and first to third dielectric layers 58 to 60 in the optical coupler 100c correspond to the substrate 31, the dielectric region 33, and the first to third dielectric layers 38 to 40 in the optical coupler 100b in Example 2.

The structure of the optical coupler 100c will now be described in more detail. The substrate 51 included in the optical coupler 100c has a Si substrate 51a and an Al reflective film 51b formed on the Si substrate 51a, and a groove 52 having a reflective surface 52a for reflecting incident light is provided on the surface of the Al reflective film 51b. The groove 52 is filled with the dielectric region 53 formed on the Al reflective film 51b. The first to fourth dielectric layers 58 to 61 form an optical waveguide 36, and the reflective surface 52a of the groove 52 and the dielectric region 53 in the groove 52 form a light introducing portion 30 for introducing light into the optical waveguide 36.

A groove 57 corresponding to the edge of a prism of a prism coupler is formed on the dielectric region 53, and the first dielectric layer 58 is formed so as to fill the groove 57. The second, third, and fourth dielectric layers 59, 60, and 61 are formed in this order on the dielectric region 53 (including the first dielectric layer 58) and have a flat surface because of the filling of the first dielectric layer 58.

PSG, SOG, or the like as well as SiO$_2$ (n$_1$=1.43; wavelength λ=780 nm) can be used for the first dielectric layer 58; however, in the present example, SiO$_2$ is used. Because of the relationship of the refractive indices of the respective dielectric layers, SiO$_2$ (n$_2$=1.43; wavelength λ=780 nm) is used for the second dielectric layer 59 shown in FIG. 15. #7059 glass, SiON, or the like can be used for the third dielectric layer 60; however, in the present example, #7059 glass (n$_3$=1.53; wavelength λ=780 nm) is used. UV-curable methacrylate resin (refractive index n$_q$=1.57; wavelength λ=780 nm) is used for the dielectric region 53.

The fourth dielectric layer 61 has the effect of decreasing the asymmetry of a refractive index distribution in the thickness direction of the Optical waveguide. In the case where the upper and lower layers adjacent to the third dielectric layer 60 through which light mainly propagates are identical, the symmetry of the refractive index distribution becomes high. Therefore, a refractive index n$_4$ is preferably equal to the refractive index n$_2$ of the second dielectric layer 59. In the present example, SiO$_2$ (n$_1$=1.43; wavelength λ=780 nm) is used.

The following case will be considered: light having a beam diameter w$_0$ of 3.76 μm at a converging point is incident so that a focal point thereof is at a position O in FIG. 15. When UV-curable resin (n$_q$=1.57; wavelength λ=780 nm) is used for the dielectric region 53 filling the groove 52 on the surface of the substrate 51, a SiO$_2$ layer as the second dielectric layer 59 is set to be 100 nm, a #7059 glass layer as the third dielectric layer 60 is set to be 570 nm, and a SiO$_2$ layer as the fourth dielectric layer 61 is set to be 1 μm so that the coupling efficiency of the TE light and the TM light be the highest.

Figure 16:
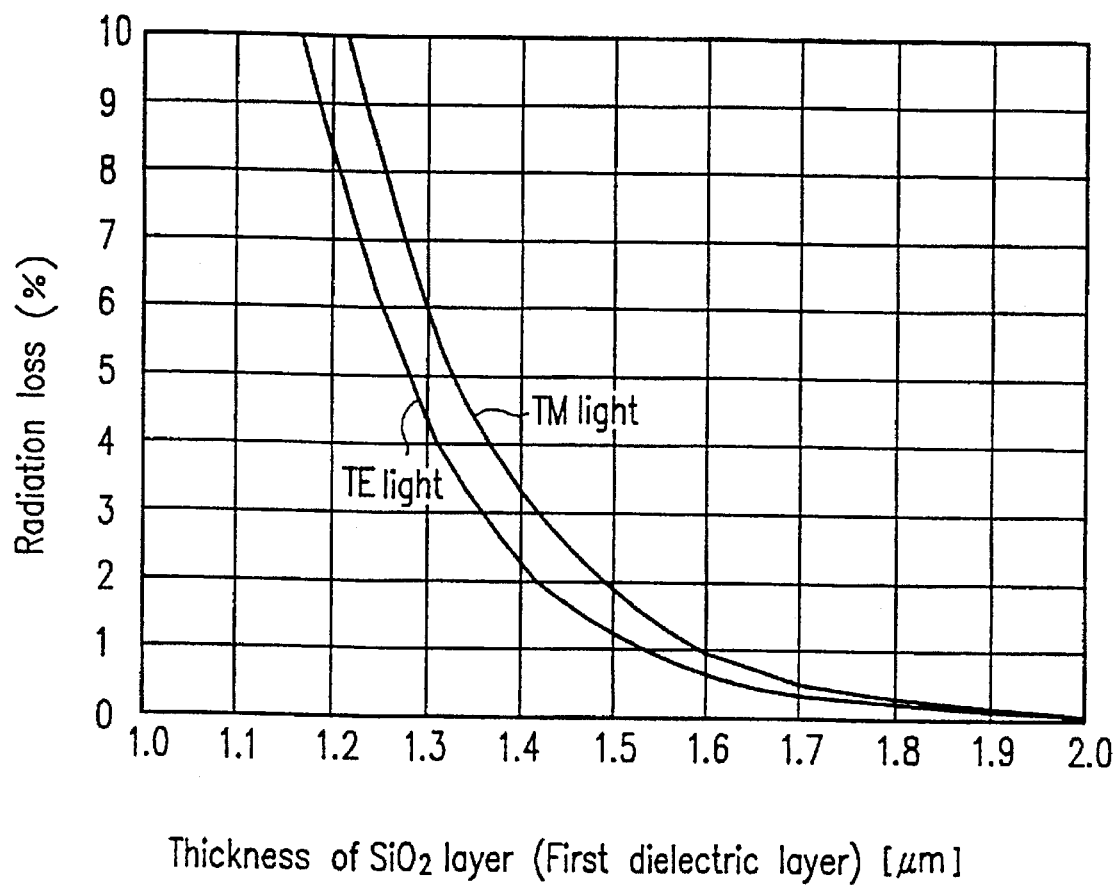
FIG. 16 is a graph showing radiation loss characteristics in the optical coupler according to the present invention and described in Example 3.
Figure 17:
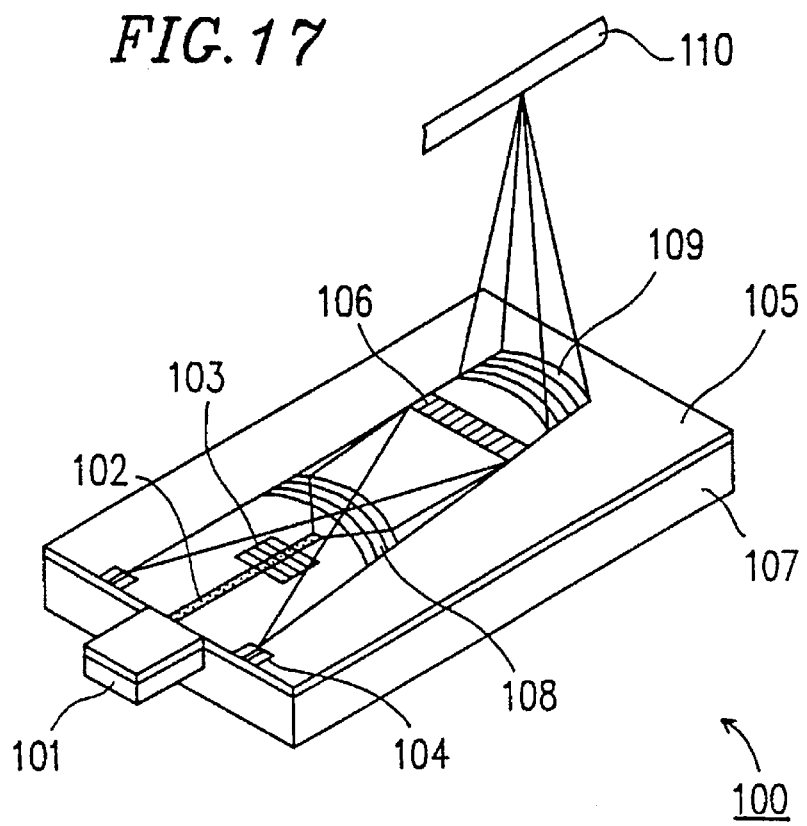
FIG. 17 shows the structure of an optical pickup device provided with an optical waveguide element, using a conventional grating coupler.
Figure 18:
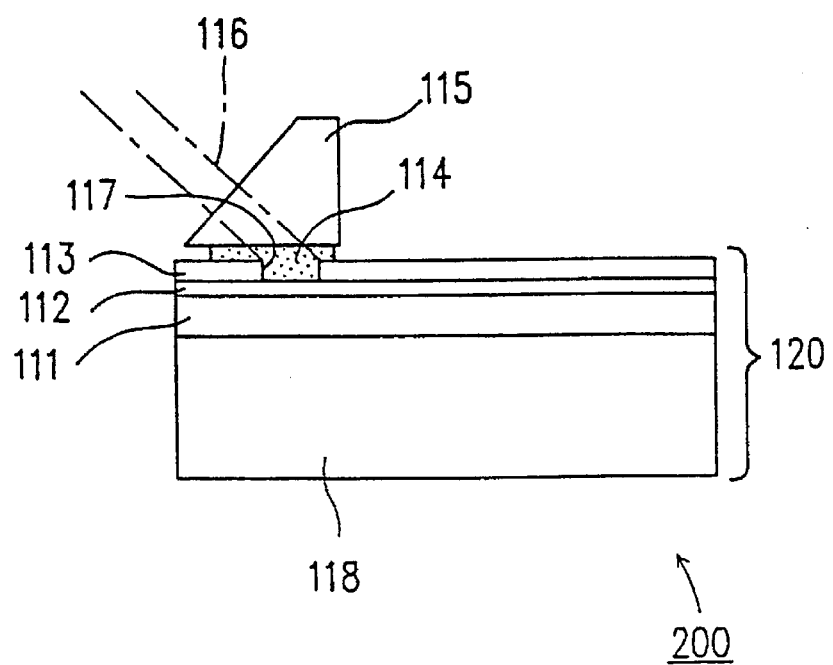
FIG. 18 shows the structure of a conventional prism coupler.

Furthermore, the thickness t' of the first dielectric layer 58 is determined so that a radiation loss (i.e., a ratio of light going outside the optical coupler while propagating to the substrate 51) is restricted. For example, in the case where the optical waveguide length is 1 mm, the thickness t' has a relationship with the radiation loss as shown in FIG. 16. In the present example, the thickness t' is set to be 1.6 μm so that the radiation loss is less than 1% under the condition that the optical waveguide length is 1 mm.

The shape of the groove 52 to be formed on the surface of the substrate 51 in the optical coupler 100c of this example can be determined in a similar manner to that in Example 2 (see FIG. 13). First, an angle ω of the reflective surface 52a of the groove 52 is obtained.

In the present example, the effective refractive indices N$_{TE}$ and N$_{TM}$ of the TE light and the TM light in the optical waveguide 36 constituted by the first dielectric layer 58, the second dielectric layer 59, the third dielectric layer 60, and the fourth dielectric layer 61 become 1.4839 and 1.4827, respectively. In this case, the difference in effective refractive index with respect to the TE light and the TM light is smaller than that in Example 2. The reason for this is as follows: The symmetry of a refractive index distribution becomes high because the refractive indices of the upper and lower SiO$_2$ layers adjacent to the #7059 layer (third dielectric layer) 60 through which light mainly propagates are identical with each other. Furthermore, the optimum incident angles θ$_{TE}$ and θ$_{TM}$ (incident angles allowing the coupling efficiency to be highest) of the TE light and the TM light are determined by θ$_{TE}$=sin$^{-1}$ (N$_{TE}$/n$_q$) and θ$_{TM}$=sin$^{-1}$ (N$_{TM}$/n$_q$). Therefore, the coupling efficiencies of the TE light and TM light can be increased in the case where the TE light and TM light are simultaneously coupled to the optical waveguide 36.

In the optical coupler 100c, the incident angle θ with respect to the optical waveguide 36 is determined by Expression (41); therefore, θ becomes 70.8°. Assuming that θ$_i$' is 0°, the angle ω of the reflective surface 52a with respect to the surface of the substrate 51 becomes 35.4° from Expression (13).

The groove 52 on the surface of the substrate 51 is filled with the dielectric region 53 made of UV-curable resin, and the thickness 1 of the resin layer above the surface of the substrate 51 is assumed to be 3 μm. A depth D of the groove 52 is determined based on the beam diameter ω$_0$ at a beam waist, the incident angle θ (=70.8°) with respect to the optical waveguide 36, and θ$_i$' (=0°).

From Expressions (12), (21), (24), and (30), the propagation distance E of light from the reflective surface 52a to the incident point O becomes 11.6 μm or more. If the propagation distance E is set to be 12 μm, it is required from Expression (34) that the depth D of the groove 52 be 2.78 μm or more.

In the present example, the angle of the reflective surface 52a with respect to the surface of the substrate 51 is set to be 35.4° and the depth D is set to be 3 μm.

In the optical coupler 100c, the distance K between the edge of the groove 52 on the substrate 51 shown in FIG. 15 and the edge of the groove 57 formed in the dielectric region 53 provided so as to fill the groove 52 is determined to be 12.4 μm (D$_0$=2.87 μm) by Expression (41). Here, the distance K is obtained under the condition that a distance x$_m$ between the incident point O and the edge of the first dielectric layer 58 of FIG. 15 is 4 μm.

In Example 3, the optical coupler 100c has a structure in which the fourth dielectric layer is further formed on the third dielectric layer constituting the optical coupler 100b of Example 2. Therefore, in addition to the effect of Example 2, the difference in effective refractive index with respect to the TE light and the TM light becomes smaller than the case where the fourth dielectric layer is not provided. Moreover, the coupling efficiencies of the TE light and the TM light can be increased in the case where the TE light and the TM light are simultaneously coupled to the optical waveguide. Furthermore, the fourth dielectric layer allows the intensity distribution of light propagating through the optical waveguide to be biased to the upper side of the optical waveguide, compared with the case where the fourth dielectric layer is not provided. Therefore, the thickness of the first dielectric layer required for preventing the loss of light caused by the re-coupling of light with the dielectric region can be made thinner, compared with the case where the fourth dielectric layer is not provided. That is, the depth of the groove to be formed in the dielectric region in the course of production of the optical coupler can be made smaller.

As described above, in the optical coupler of the present invention recited in claim 1, a light introducing portion is provided across the boundary between a thin portion and a thick portion of a dielectric layer included in an optical waveguide. The light introducing portion has a flat section through which incident light introduced into the optical waveguide can pass without being reflected. Therefore, light can be coupled to the optical waveguide based on the principle of a prism coupler having a coupling efficiency with great tolerance with respect to the changes in wavelength.

Moreover, the light introducing portion is formed on the optical waveguide by molding a transparent material having a refractive index higher than that of the dielectric layer. Therefore, it is not required that the light introducing portion is separately produced as in a prism that is placed on the optical waveguide. This results in the optical couple being more simply mass-produced.

In addition, the use of transparent material for forming the light introducing portion of the above-mentioned optical coupler can reduce the production cost. Moreover, the size and shape of the light introducing portion are stipulated based on the wavelength of incident light, the beam diameter at a beam waist, the refractive index of a material for the light introducing portion, and the incident angle of the incident light with respect to the incident surface of the optical waveguide. Therefore, the light introducing portion can be designed as small as possible. In other words, the thickness of the optical coupler can be made thin in accordance with the beam diameter by determining the distance from the boundary between the dielectric region forming the light introducing portion and the third dielectric layer to the lower portion of the incident surface of the light introducing portion, the height of the incident surface, and the shape of the dielectric region.

Furthermore, the optical coupler of the present invention has a substrate on which a groove having a reflective surface for reflecting incident light is formed. An optical waveguide is provided on the substrate via a dielectric layer in such a manner that the boundary between a thin portion and a thick portion of the dielectric layer forming the optical waveguide is positioned in the groove of the substrate. Furthermore, the dielectric region in the groove is made a light introducing portion for introducing incident light into the Optical waveguide. Therefore, optical coupling with the optical waveguide can be conducted based on the principle of a prism coupler having a coupling efficiency with great tolerance with respect to the changes in wavelength.

In addition, since the light introducing portion is provided between the substrate and the optical waveguide, it is not required that the light introducing portion be separately produced as in a prism that is placed on the optical waveguide. This results in the optical couple being more simply mass-produced.

Furthermore, since the light introducing portion is provided between the substrate and the optical waveguide, there are no projections from the surface of the optical waveguide. Thus, the optical coupler can be made thinner and smaller, compared with the one in which a light introducing portion made of a material with a high refractive index is formed on the optical waveguide.

In the optical coupler of the present invention, in addition to the first, second, and third dielectric layers forming the optical waveguide, the fourth dielectric layer is formed on the third dielectric layer. Therefore, the difference in effective refractive index with respect to the incidence of TE light and TM light upon the optical coupler becomes smaller than the case where the fourth dielectric layer is not provided, and the coupling efficiency of the TE light and the TM light in the case where the TE light and the TM light are simultaneously incident can be increased.

Furthermore, the fourth dielectric layer allows the intensity distribution of light propagating through the optical waveguide to be biased to the upper side of the optical waveguide, compared with the case where the fourth dielectric layer is not provided. Therefore, the thickness of the first dielectric layer required for preventing the loss of light caused by the re-coupling of light with the dielectric region can be made thinner, compared with the case where the fourth dielectric layer is not provided. That is, the depth of the groove to be formed in the dielectric region in the course of production of the optical coupler can be made smaller.

According to the method for producing an optical coupler of the present invention, in the course of production of the optical coupler mentioned above, UV-curable resin is supplied on the optical waveguide including the first, second, and third dielectric layers, and the resin is held in a predetermined shape by using a UV-transparent frame member with a concave portion having a flat portion corresponding to the incident surface of the light introducing portion. Under this condition, the resin is cured by the irradiation of UV light. Therefore, problems involved in producing prisms, such as those caused when prisms are fixed onto prism couplers and those related to mass-production, can be solved.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical coupler comprising:
   an optical waveguide including a substrate, a first dielectric layer formed on the substrate, a second dielectric layer which is formed on the first dielectric layer and has a refractive index lower than a refractive index of the first dielectric layer, and a third dielectric layer which is formed on a part of the second dielectric layer and has a refractive index equal to or lower than the refractive index of the second dielectric layer; and
   a light introducing portion made of a transparent material having a refractive index higher than the refractive index of each of the dielectric layers, the light introducing portion being formed on the optical waveguide and introducing converged incident light into the optical waveguide,
   wherein the light introducing portion is provided across a surface of the second dielectric layer and a surface of the third dielectric layer and has, as a light incident surface, a flat portion having the size allowing the incident light introduced into the optical waveguide to pass through without eclipse.

2. An optical coupler according to claim 1, wherein the light introducing portion is composed of a part of a resin layer having a refractive index higher than the refractive index of each of the dielectric layers, the resin layer being formed over an entire surface of the second dielectric layer and the third dielectric layer of the optical waveguide.

3. An optical coupler according to claim 2, wherein an angle $\alpha$ between the light incident surface of the light introducing portion and a light incident surface of the optical waveguide is equal to an incident angle $\theta_i$ of light with respect to the light incident surface of the optical waveguide;

a boundary between a portion of the surface of the second dielectric layer in contact with the light introducing portion and a portion of the surface of the second dielectric layer in contact with the third dielectric layer is in parallel with a lower end of the light incident surface of the light introducing portion; and a distance B between a lower end of a light incident surface of the optical waveguide and the boundary, a height H of an upper end of the light incident surface of the light introducing portion from the surface of the second dielectric layer, a beam diameter $w_0$ of the incident light at a beam waist, and a thickness l of a portion of the resin layer other than the light introducing portion satisfy the following relationships:

$B > x_1/\sin\theta_i - l/\tan\theta_i + L/2$ $H > 2y_1 \sin\theta_i + l$ $L = \rho w_0/[\cos\theta_i\{1-(4\rho^2\lambda^2 \tan^2\theta_i/n_p^2\pi^2 w_0^2)\}^{1/2}]$ $x_1 = \{-b_1 + (b_1^2 - a_1 c_1)^{1/2}\}/a_1$ $y_1 = x_1/\tan\theta_i - l/\sin\theta_i$ $a_1 = 1/\tan^2\theta_i - 4\lambda^2\rho^2/n_p^2\pi^2 w_0^2$ $b_1 = -l/\sin\theta_i \cos\theta_i$ $c_1 = l^2/\sin^2\theta_i - w_0^2\rho^2/4$ $\rho = \{-ln(0.18)\}^{1/2}$ where $n_p$ is a refractive index of the resin layer, $\lambda$ is a wavelength of the incident light, and $\rho$ is a coefficient stipulating a beam diameter $\rho w_0$ containing at least 99% of the energy of the incident light.

4. An optical coupler comprising:

a substrate on which a groove having a reflective surface reflecting incident light is formed;

a dielectric region formed on the substrate so as to fill the groove;

a first dielectric layer formed on a surface of the dielectric region so that an end portion thereof is positioned in the groove;

a second dielectric layer formed on the dielectric region and the first dielectric layer; and a third dielectric layer formed on the second dielectric layer, wherein the first dielectric layer, the second dielectric layer, and the third dielectric layer form an optical waveguide, and the reflective surface of the groove and the dielectric region in the groove form a light introducing portion for introducing the incident light into the optical waveguide, and wherein a refractive index $n_1$ of the first dielectric layer, a refractive index $n_q$ of the dielectric region, a refractive index $n_2$ of the second dielectric layer, and a refractive index $n_3$ of the third dielectric layer satisfy relationships $n_1 \leq n_2$, $n_2 < n_3$, and the refractive index $n_q$ is higher than any of the refractive indices $n_1$, $n_2$, and $n_3$.

5. An optical coupler comprising:

a substrate on which a groove having a reflective surface reflecting incident light is formed;

a dielectric region formed on the substrate so as to fill the groove;

a first dielectric layer formed on a surface of the dielectric region so that an end portion thereof is positioned in the groove;

a second dielectric layer formed on the dielectric region and the first dielectric layer;

a third dielectric layer formed on the second dielectric layer; and a fourth dielectric layer formed on the third dielectric layer, wherein the first dielectric layer, the second dielectric layer, and the third dielectric layer form an optical waveguide, and the reflective surface of the groove and the dielectric region in the groove form a light introducing portion for introducing the incident light into the optical waveguide, and wherein a refractive index $n_1$ of the first dielectric layer, a refractive index $n_q$ of the dielectric region, a refractive index $n_2$ of the second dielectric layer, and a refractive index $n_3$ of the third dielectric layer, and a refractive index $n_4$ of the fourth dielectric layer satisfy relationships $n_1 \leq n_2$, $n_2 < n_3$, and $n_4 < n_3$ and the refractive index $n_q$ is higher than any of the refractive indices $n_1$, $n_2$, $n_3$, and $n_4$.

6. A method for producing an optical coupler as recited in claim 2, comprising the steps of:

supplying a UV-curable resin on the optical waveguide including the first dielectric layer, the second dielectric layer, and the third dielectric layer; and irradiating UV-light to the resin supplied on the optical waveguide while holding the resin in a predetermined shape using a frame member transmitting UV-light, the frame member having a concave portion with a flat region corresponding to the light incident surface of the light introducing portion.

* * * * *